(12) United States Patent
Smith et al.

(10) Patent No.: US 7,908,077 B2
(45) Date of Patent: Mar. 15, 2011

(54) LAND USE COMPATIBILITY PLANNING SOFTWARE

(75) Inventors: Alexander E. Smith, McLean, VA (US); Jonathan C. Baldwin, Alexandria, VA (US); Robert P. Blair, Wesley Chapel, FL (US); Thomas J. Breen, Tyngsborough, MA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1135 days.

(21) Appl. No.: 11/031,457

(22) Filed: Jan. 7, 2005

(65) Prior Publication Data

US 2005/0182557 A1 Aug. 18, 2005

Related U.S. Application Data

(63) Continuation-in-part of application No. 10/751,115, filed on Jan. 5, 2004, now Pat. No. 6,992,626, and a continuation-in-part of application No. 10/457,439, filed on Jun. 10, 2003, now Pat. No. 6,885,340, and a continuation-in-part of application No. 10/743,042, filed on Dec. 23, 2003, now Pat. No. 7,132,982, and a continuation-in-part of application No. 10/756,799, filed on Jan. 14, 2004, now Pat. No. 7,126,534, and a continuation-in-part of application No. 10/830,444, filed on Apr. 23, 2004, now Pat. No. 7,123,192.

(60) Provisional application No. 60/534,706, filed on Jan. 8, 2004.

(51) Int. Cl.
*G08G 5/02* (2006.01)
*G08G 5/04* (2006.01)
*G08G 7/78* (2006.01)
*G06G 7/72* (2006.01)
*G01S 13/93* (2006.01)

(52) U.S. Cl. ........ 701/120; 701/200; 701/301; 340/945; 340/972; 340/995.24; 342/29

(58) Field of Classification Search ............... 701/1, 120, 701/200, 207, 208, 300, 301; 340/945, 972, 340/995.1, 995.14, 995.24; 244/114 R; 342/29; 702/5

See application file for complete search history.

(56) References Cited

U.S. PATENT DOCUMENTS

1,738,571 A 12/1929 Gare ................................ 404/18
(Continued)

FOREIGN PATENT DOCUMENTS

DE 4306660 A1 8/1974
(Continued)

OTHER PUBLICATIONS

VDL4 TM Alignment With DO-242A (RTCA ADS-B MASPS) WG51/SG2, NASA, Sep. 2003.
(Continued)

*Primary Examiner* — Jack Keith
*Assistant Examiner* — Edward Pipala (57) ABSTRACT

A land use compatibility software module uses an existing suite of airport management programs to generate exception reports for FAA Part 77 land use compatibly surveys. Land use compatibility management is a manually intensive and time-consuming process. The noise officer may have to compute whether a proposed structure violates FAA's obstruction clearance criteria as set out in FAA's standard for obstacle clearance zones (Part 77). With these three-dimensional zone shapes entered into AirScene™, the user may enter lat/long and height data for potential obstructions, such as cellular telephone towers as mentioned in the above example. The system will plot the potential obstructions on the map and will determine whether or not the height and proposed position of the tower violates the FAA's obstruction criteria for that runway. The system may be used to generate "exception reports" for proposed structures.

9 Claims, 4 Drawing Sheets

U.S. PATENT DOCUMENTS

| | | | |
|---|---|---|---|
| 3,668,403 A | 6/1972 | Meilander | 701/121 |
| 3,705,404 A | 12/1972 | Chisholm | 343/112 R |
| 3,792,472 A | 2/1974 | Payne et al. | 342/32 |
| 4,079,414 A | 3/1978 | Sullivan | 725/114 |
| 4,115,771 A | 9/1978 | Litchford | 343/6 R |
| 4,122,522 A | 10/1978 | Smith | 701/15 |
| 4,167,006 A | 9/1979 | Funatsu et al. | 343/6.5 LC |
| 4,196,474 A | 4/1980 | Buchanan et al. | 364/461 |
| 4,224,669 A | 9/1980 | Brame | 701/8 |
| 4,229,737 A | 10/1980 | Heldwein et al. | 343/6 R |
| 4,293,857 A | 10/1981 | Baldwin | 343/6.5 |
| 4,315,609 A | 2/1982 | McLean et al. | |
| 4,327,437 A | 4/1982 | Frosch et al. | 714/3 |
| 4,359,733 A | 11/1982 | O'Neill | 342/36 |
| 4,454,510 A | 6/1984 | Crow | 343/5 |
| 4,524,931 A | 6/1985 | Nilsson | 246/167 |
| 4,646,244 A | 2/1987 | Bateman | 701/301 |
| 4,688,046 A | 8/1987 | Schwab | 342/456 |
| 4,782,450 A | 11/1988 | Flax | 364/461 |
| 4,811,308 A | 3/1989 | Michel | 367/136 |
| 4,843,397 A | 6/1989 | Galati et al. | 342/59 |
| 4,853,700 A | 8/1989 | Funatsu et al. | 342/30 |
| 4,897,661 A | 1/1990 | Hiraiwa | 342/457 |
| 4,899,296 A | 2/1990 | Khattak | 702/40 |
| 4,910,526 A | 3/1990 | Donnangelo et al. | 342/455 |
| 4,914,733 A | 4/1990 | Gralnick | 340/961 |
| 4,958,306 A | 9/1990 | Powell et al. | 702/40 |
| 5,001,490 A | 3/1991 | Fichtner | 342/195 |
| 5,001,650 A | 3/1991 | Francis et al. | 364/516 |
| 5,017,930 A | 5/1991 | Stoltz et al. | 342/465 |
| 5,025,382 A | 6/1991 | Artz | 364/439 |
| 5,027,114 A | 6/1991 | Kawashima et al. | 340/941 |
| 5,045,861 A | 9/1991 | Duffett-Smith | 342/457 |
| 5,075,680 A | 12/1991 | Dabbs | 342/52 |
| 5,075,694 A | 12/1991 | Donnangelo et al. | 342/455 |
| 5,081,457 A | 1/1992 | Motisher et al. | 342/40 |
| 5,089,822 A | 2/1992 | Abaunza et al. | 342/30 |
| 5,113,193 A | 5/1992 | Powell et al. | 342/25 |
| 5,119,102 A | 6/1992 | Barnard | 342/357 |
| 5,132,695 A | 7/1992 | Sumas et al. | 342/461 |
| 5,138,321 A | 8/1992 | Hammer | 342/36 |
| 5,144,315 A | 9/1992 | Schwab et al. | 342/49 |
| 5,153,836 A | 10/1992 | Fraughton et al. | 364/461 |
| 5,179,384 A | 1/1993 | De Haan | 342/37 |
| 5,191,342 A | 3/1993 | Alsup et al. | 342/465 |
| 5,200,902 A | 4/1993 | Pilley | 364/439 |
| 5,225,842 A | 7/1993 | Brown et al. | 342/357 |
| 5,260,702 A | 11/1993 | Thompson | 340/970 |
| 5,262,784 A | 11/1993 | Drobnicki et al. | 342/45 |
| 5,265,023 A | 11/1993 | Sokkappa | 364/439 |
| 5,268,698 A | 12/1993 | Smith et al. | 342/450 |
| 5,283,574 A | 2/1994 | Grove | 340/970 |
| 5,311,194 A | 5/1994 | Brown | 342/357 |
| 5,317,316 A | 5/1994 | Sturm et al. | 342/30 |
| 5,317,317 A | 5/1994 | Billaud et al. | 342/40 |
| 5,339,281 A | 8/1994 | Narendra et al. | 367/5 |
| 5,341,139 A | 8/1994 | Billaud et al. | 342/40 |
| 5,365,516 A | 11/1994 | Jandrell | 370/18 |
| 5,374,932 A | 12/1994 | Wyschogrod et al. | 342/36 |
| 5,379,224 A | 1/1995 | Brown et al. | 364/449 |
| 5,381,140 A | 1/1995 | Kuroda et al. | 340/961 |
| 5,402,116 A | 3/1995 | Ashley | 340/870.1 |
| 5,406,288 A | 4/1995 | Billaud et al. | 342/37 |
| 5,424,746 A | 6/1995 | Schwab et al. | 342/49 |
| 5,424,748 A | 6/1995 | Pourailly et al. | 342/157 |
| 5,438,337 A | 8/1995 | Aguado | 342/357 |
| 5,448,233 A | 9/1995 | Saban et al. | 340/963 |
| 5,450,329 A | 9/1995 | Tanner | 364/449 |
| 5,454,720 A | 10/1995 | FitzGerald et al. | 434/27 |
| 5,455,586 A | 10/1995 | Barbier et al. | 342/37 |
| 5,471,657 A | 11/1995 | Gharpuray | 455/12.1 |
| 5,486,829 A | 1/1996 | Potier et al. | 342/40 |
| 5,493,309 A | 2/1996 | Bjornholt | 342/455 |
| 5,506,590 A | 4/1996 | Minter | 342/462 |
| 5,515,286 A | 5/1996 | Simon | 364/461 |
| 5,528,244 A | 6/1996 | Schwab | 342/37 |
| 5,534,871 A | 7/1996 | Hidaka et al. | 342/113 |
| 5,541,608 A | 7/1996 | Murphy et al. | 342/442 |
| 5,570,095 A | 10/1996 | Drouilhet, Jr. et al. | 342/357 |
| 5,570,099 A | 10/1996 | DesJardins | 342/378 |
| 5,583,775 A | 12/1996 | Nobe et al. | 364/449.7 |
| 5,590,044 A | 12/1996 | Buckreub | 364/453 |
| 5,596,326 A | 1/1997 | Fitts | 342/30 |
| 5,596,332 A | 1/1997 | Coles et al. | 364/464.27 |
| 5,608,412 A | 3/1997 | Welles, II et al. | 342/457 |
| 5,614,912 A | 3/1997 | Mitchell | 342/146 |
| 5,617,101 A | 4/1997 | Maine et al. | 342/358 |
| 5,627,546 A | 5/1997 | Crow | 342/352 |
| 5,629,691 A | 5/1997 | Jain | 340/961 |
| 5,635,693 A | 6/1997 | Benson et al. | 235/384 |
| 5,659,319 A | 8/1997 | Rost et al. | 342/36 |
| 5,666,110 A | 9/1997 | Paterson | 340/970 |
| 5,670,960 A | 9/1997 | Cessat | 342/25 |
| 5,670,961 A | 9/1997 | Tomita et al. | 342/36 |
| 5,677,841 A | 10/1997 | Shiomi et al. | 365/439 |
| 5,680,140 A | 10/1997 | Loomis | 342/357 |
| 5,686,921 A | 11/1997 | Okada et al. | 342/127 |
| 5,714,948 A | 2/1998 | Farmakis et al. | 340/961 |
| 5,732,384 A | 3/1998 | Ellert et al. | 701/120 |
| 5,752,216 A | 5/1998 | Carlson et al. | 701/120 |
| 5,757,315 A | 5/1998 | Aoki | 342/357 |
| 5,774,829 A | 6/1998 | Cisneros et al. | 701/213 |
| 5,781,150 A | 7/1998 | Norris | 342/357 |
| 5,784,022 A | 7/1998 | Kupfer | 342/80 |
| 5,793,329 A | 8/1998 | Nakada et al. | 342/357 |
| 5,798,712 A | 8/1998 | Coquin | 340/970 |
| 5,802,542 A | 9/1998 | Coiera et al. | 711/4 |
| 5,825,021 A | 10/1998 | Uemura | 250/222.1 |
| 5,828,333 A | 10/1998 | Richardson et al. | 342/70 |
| 5,839,080 A | 11/1998 | Muller | 701/9 |
| 5,841,391 A | 11/1998 | Lucas, Jr. et al. | 342/34 |
| 5,841,398 A | 11/1998 | Brock | 342/357 |
| 5,850,420 A | 12/1998 | Guillard et al. | 375/316 |
| 5,867,804 A | 2/1999 | Pilley et al. | 701/120 |
| 5,872,526 A | 2/1999 | Tognazzini | 340/961 |
| 5,884,222 A | 3/1999 | Denoize et al. | 701/301 |
| 5,890,068 A | 3/1999 | Fattouche et al. | 455/456.2 |
| 5,892,462 A | 4/1999 | Tran | 340/961 |
| 5,913,912 A | 6/1999 | Nishimura et al. | 701/35 |
| 5,920,277 A | 7/1999 | Foster et al. | 342/32 |
| 5,920,318 A | 7/1999 | Salvatore, Jr. et al. | 345/418 |
| 5,923,293 A | 7/1999 | Smith et al. | 342/455 |
| 5,949,375 A | 9/1999 | Ishiguro et al. | 342/457 |
| 5,969,674 A | 10/1999 | von der Embse et al. | 342/357.16 |
| 5,977,905 A | 11/1999 | Le Chevalier | 342/163 |
| 5,979,234 A | 11/1999 | Karlsen | 73/170.13 |
| 5,990,833 A | 11/1999 | Ahlbom et al. | 342/417 |
| 5,991,687 A | 11/1999 | Hale et al. | 701/207 |
| 5,995,040 A | 11/1999 | Issler et al. | 342/352 |
| 5,999,116 A | 12/1999 | Evers | 342/36 |
| 6,043,777 A | 3/2000 | Bergman et al. | 342/357 |
| 6,044,322 A | 3/2000 | Stieler | 701/120 |
| 6,049,304 A | 4/2000 | Rudel et al. | 342/357.08 |
| 6,049,754 A | 4/2000 | Beaton et al. | 701/204 |
| 6,075,479 A | 6/2000 | Kudoh | 342/70 |
| 6,081,222 A | 6/2000 | Henkel et al. | 342/45 |
| 6,081,764 A | 6/2000 | Varon | 701/120 |
| 6,085,150 A | 7/2000 | Henry et al. | 701/301 |
| 6,088,634 A | 7/2000 | Muller | 701/9 |
| 6,092,009 A | 7/2000 | Glover | 701/14 |
| 6,094,169 A | 7/2000 | Smith et al. | 342/465 |
| 6,122,570 A | 9/2000 | Muller | 701/9 |
| 6,127,944 A | 10/2000 | Daly | 340/963 |
| 6,133,867 A | 10/2000 | Eberwine et al. | 342/29 |
| 6,138,060 A | 10/2000 | Conner | 701/9 |
| 6,147,748 A | 11/2000 | Hughes | 356/4.09 |
| 6,161,097 A | 12/2000 | Glass et al. | 705/6 |
| 6,178,363 B1 | 1/2001 | McIntyre et al. | 701/16 |
| 6,188,937 B1 | 2/2001 | Sherry et al. | 701/14 |
| 6,194,040 B1 | 2/2001 | Delius et al. | 342/357.12 |
| 6,195,609 B1 | 2/2001 | Pilley | 701/120 |
| 6,201,499 B1 | 3/2001 | Hawkes et al. | 342/387 |
| 6,208,284 B1 | 3/2001 | Woodell et al. | 342/30 |
| 6,208,937 B1 | 3/2001 | Huddle | 701/221 |
| 6,211,811 B1 | 4/2001 | Evers | 342/36 |
| 6,219,592 B1 | 4/2001 | Muller et al. | 701/9 |

| | | | |
|---|---|---|---|
| 6,222,480 B1 | 4/2001 | Kuntman et al. ............... 342/30 |
| 6,225,942 B1 | 5/2001 | Alon ............................ 342/59 |
| 6,230,018 B1 | 5/2001 | Watters et al. ............... 455/456 |
| 6,233,522 B1 | 5/2001 | Morici ........................ 701/208 |
| 6,239,739 B1 | 5/2001 | Thomson et al. ............... 342/96 |
| 6,240,345 B1 | 5/2001 | Vesel ............................ 701/31 |
| 6,246,342 B1 | 6/2001 | Vandevoorde et al. ....... 340/961 |
| 6,253,147 B1 | 6/2001 | Greenstein ................... 701/202 |
| 6,271,768 B1 | 8/2001 | Frazier, Jr. et al. .......... 340/961 |
| 6,275,172 B1 | 8/2001 | Curtis et al. ................. 340/961 |
| 6,275,767 B1 | 8/2001 | Delseny et al. ............... 701/120 |
| 6,282,487 B1 | 8/2001 | Shiomi et al. ................ 701/120 |
| 6,282,488 B1 | 8/2001 | Castor et al. ................ 701/120 |
| 6,289,280 B1 | 9/2001 | Fernandez-Corbaton et al. ............. 701/214 |
| 6,292,721 B1 | 9/2001 | Conner et al. ................... 701/9 |
| 6,311,127 B1 | 10/2001 | Stratton et al. ............. 701/213 |
| 6,314,361 B1 | 11/2001 | Yu et al. ..................... 701/120 |
| 6,314,363 B1 | 11/2001 | Pilley et al. .................. 701/120 |
| 6,317,663 B1 | 11/2001 | Meunier et al. ............... 701/16 |
| 6,321,091 B1 | 11/2001 | Holland ....................... 455/456 |
| 6,327,471 B1 | 12/2001 | Song ........................... 455/440 |
| 6,329,947 B2 | 12/2001 | Smith .......................... 342/418 |
| 6,337,652 B1 | 1/2002 | Shiomi et al. ................... 342/37 |
| 6,338,011 B1 | 1/2002 | Furst et al. ....................... 701/1 |
| 6,339,745 B1 | 1/2002 | Novik ......................... 701/208 |
| 6,340,935 B1 | 1/2002 | Hall .......................... 340/932.2 |
| 6,340,947 B1 | 1/2002 | Chang et al. ............. 342/357.01 |
| 6,344,820 B1 | 2/2002 | Shiomi et al. ................ 342/174 |
| 6,347,263 B1 | 2/2002 | Johnson et al. ................ 701/14 |
| 6,348,856 B1 | 2/2002 | Jones et al. .................. 340/10.1 |
| 6,366,240 B1 | 4/2002 | Timothy et al. .............. 342/417 |
| 6,377,208 B2 | 4/2002 | Chang et al. ............. 342/357.01 |
| 6,380,869 B1 | 4/2002 | Simon et al. ................. 340/945 |
| 6,380,870 B1 | 4/2002 | Conner et al. ............... 340/970 |
| 6,384,783 B1 | 5/2002 | Smith et al. .................. 342/387 |
| 6,393,359 B1 | 5/2002 | Flynn et al. ................. 701/120 |
| 6,396,435 B1 | 5/2002 | Fleischhauer et al. .......... 342/70 |
| 6,408,233 B1 | 6/2002 | Solomon et al. ................ 342/35 |
| 6,414,629 B1 | 7/2002 | Curcio .................... 342/357.08 |
| 6,415,219 B1 | 7/2002 | Degodyuk ..................... 70/117 |
| 6,420,993 B1 | 7/2002 | Varon ........................... 342/36 |
| 6,445,310 B1 | 9/2002 | Bateman et al. .............. 340/970 |
| 6,445,927 B1 | 9/2002 | King et al. ................... 455/456 |
| 6,448,929 B1 | 9/2002 | Smith et al. .................. 342/456 |
| 6,459,411 B2 | 10/2002 | Frazier et al. ................ 342/455 |
| 6,462,674 B2 | 10/2002 | Ohmura et al. ............... 340/901 |
| 6,463,383 B1 | 10/2002 | Baiada et al. ................ 701/120 |
| 6,469,654 B1 | 10/2002 | Winner et al. ................... 342/33 |
| 6,469,655 B1 | 10/2002 | Franke et al. ................... 342/36 |
| 6,469,664 B1 | 10/2002 | Michaelson et al. ...... 342/357.13 |
| 6,473,027 B1 | 10/2002 | Alon .............................. 342/37 |
| 6,473,694 B1 | 10/2002 | Akopian et al. .............. 701/213 |
| 6,477,449 B1 | 11/2002 | Conner et al. ..................... 701/4 |
| 6,492,932 B1 | 12/2002 | Jin et al. ........................ 342/25 |
| 6,493,610 B1 | 12/2002 | Ezaki ............................... 701/3 |
| 6,504,490 B2 | 1/2003 | Mizushima ................... 340/943 |
| 6,518,916 B1 | 2/2003 | Ashihara et al. ................ 342/70 |
| 6,522,295 B2 | 2/2003 | Baugh et al. .................. 342/453 |
| 6,531,978 B2 | 3/2003 | Tran .............................. 342/29 |
| 6,542,809 B2 | 4/2003 | Hehls, III ..................... 701/120 |
| 6,542,810 B2 | 4/2003 | Lai .............................. 701/120 |
| 6,545,631 B2 | 4/2003 | Hudson et al. ................. 342/30 |
| 6,549,829 B1 | 4/2003 | Anderson et al. ............... 701/16 |
| 6,563,432 B1 | 5/2003 | Millgard ....................... 340/961 |
| 6,567,043 B2 | 5/2003 | Smith et al. .................. 342/450 |
| 6,571,155 B2 | 5/2003 | Carriker et al. ................... 701/3 |
| 6,584,400 B2 | 6/2003 | Beardsworth ................. 701/120 |
| 6,584,414 B1 | 6/2003 | Green et al. .................... 702/33 |
| 6,587,079 B1 | 7/2003 | Rickard et al. ................ 342/387 |
| 6,606,034 B1 | 8/2003 | Muller et al. ................. 340/970 |
| 6,660,563 B1 | 8/2003 | Corcoran, III ................. 701/301 |
| 6,615,648 B1 | 9/2003 | Ferguson et al. ................. 73/146 |
| 6,617,997 B2 | 9/2003 | Ybarra et al. .................... 342/29 |
| 6,618,008 B1 | 9/2003 | Scholz ......................... 342/427 |
| 6,633,259 B1 | 10/2003 | Smith et al. .................. 342/456 |
| 6,657,578 B2 | 12/2003 | Stayton et al. .................. 342/30 |
| 6,680,697 B1 | 1/2004 | Bruzzone et al. ................ 342/29 |
| 6,690,295 B1 | 2/2004 | De Boer ....................... 340/951 |
| 6,690,296 B2 | 2/2004 | Corwin et al. ................. 340/961 |
| 6,690,618 B2 | 2/2004 | Tomasi et al. ................. 367/127 |
| 6,691,004 B2 | 2/2004 | Johnson ......................... 701/14 |
| 6,707,394 B2 | 3/2004 | Ishihara ....................... 340/970 |
| 6,710,719 B1 | 3/2004 | Jones et al. ............... 340/825.49 |
| 6,710,723 B2 | 3/2004 | Muller ......................... 340/970 |
| 6,714,782 B1 | 3/2004 | Monot et al. .................. 455/431 |
| 6,721,652 B1 | 4/2004 | Sanqunetti .................... 701/207 |
| 6,744,396 B2 | 6/2004 | Stone et al. ..................... 342/36 |
| 6,750,815 B2 | 6/2004 | Michaelson et al. ...... 342/357.13 |
| 6,751,545 B2 | 6/2004 | Walter ......................... 701/120 |
| 6,760,387 B2 | 7/2004 | Langford et al. .............. 375/267 |
| 6,765,533 B2 | 7/2004 | Szajnowski ................... 342/465 |
| 6,789,011 B2 | 9/2004 | Baiada et al. ................ 701/120 |
| 6,789,016 B2 | 9/2004 | Bayh et al. .................... 701/301 |
| 6,792,058 B1 | 9/2004 | Hershey et al. ................ 375/347 |
| 6,798,381 B2 | 9/2004 | Benner et al. ................. 342/450 |
| 6,799,114 B2 | 9/2004 | Etnyre ......................... 701/120 |
| 6,801,152 B1 | 10/2004 | Rose .............................. 342/13 |
| 6,801,155 B2 | 10/2004 | Jahangir et al. ................. 342/90 |
| 6,809,679 B2 | 10/2004 | LaFrey et al. ................... 342/37 |
| 6,810,329 B2 | 10/2004 | Koga ........................... 701/211 |
| 6,812,890 B2 | 11/2004 | Smith et al. .................. 342/454 |
| 6,816,105 B2 | 11/2004 | Winner et al. ................... 342/37 |
| 6,819,282 B1 | 11/2004 | Galati et al. ..................... 342/37 |
| 6,823,188 B1 | 11/2004 | Stern .......................... 455/456.1 |
| 6,828,921 B2 | 12/2004 | Brown et al. ................. 340/945 |
| 6,845,362 B2 | 1/2005 | Furuta et al. ..................... 705/13 |
| 6,861,982 B2 | 3/2005 | Forstrom et al. .............. 342/387 |
| 6,862,519 B2 | 3/2005 | Walter ......................... 701/120 |
| 6,862,541 B2 | 3/2005 | Mizushima ..................... 702/26 |
| 6,865,484 B2 | 3/2005 | Miyasaka et al. ............. 701/213 |
| 6,873,269 B2 | 3/2005 | Tran ............................ 340/961 |
| 6,873,903 B2 | 3/2005 | Baiada et al. ................ 701/120 |
| 6,876,859 B2 | 4/2005 | Anderson et al. ........... 455/456.1 |
| 6,882,930 B2 | 4/2005 | Trayford et al. .............. 701/117 |
| 6,885,340 B2 | 4/2005 | Smith et al. .................. 342/465 |
| 6,900,760 B2 | 5/2005 | Groves ...................... 342/357.14 |
| 6,912,461 B2 | 6/2005 | Poreda ......................... 701/120 |
| 6,927,701 B2 | 8/2005 | Schmidt et al. ............... 340/959 |
| 6,930,638 B2 | 8/2005 | Lloyd et al. ................... 342/453 |
| 6,952,631 B2 | 10/2005 | Griffith et al. ................... 701/13 |
| 6,963,304 B2 | 11/2005 | Murphy .................... 342/357.02 |
| 6,967,616 B2 | 11/2005 | Etnyre .......................... 342/182 |
| 6,977,612 B1 | 12/2005 | Bennett .................... 342/357.07 |
| 6,985,103 B2 | 1/2006 | Ridderheim et al. ............ 342/30 |
| 6,985,743 B2 | 1/2006 | Bajikar ...................... 455/456.1 |
| 6,992,626 B2 | 1/2006 | Smith .......................... 342/454 |
| 7,006,032 B2 | 2/2006 | King et al. ...................... 342/29 |
| 7,012,552 B2 | 3/2006 | Baugh et al. ................. 340/945 |
| 7,026,987 B2 | 4/2006 | Lokshin et al. ........... 342/357.12 |
| 7,030,780 B2 | 4/2006 | Shiomi et al. ................. 340/961 |
| 7,043,355 B2 | 5/2006 | Lai .............................. 701/120 |
| 7,050,909 B2 | 5/2006 | Nichols et al. ................ 701/301 |
| 7,053,792 B2 | 5/2006 | Aoki et al. .................... 340/928 |
| 7,058,506 B2 | 6/2006 | Kawase et al. ................ 701/201 |
| 7,062,381 B1 | 6/2006 | Rekow et al. ................. 701/300 |
| 7,065,443 B2 | 6/2006 | Flynn et al. .................. 701/120 |
| 7,071,843 B2 | 7/2006 | Hashida et al. .......... 340/995.12 |
| 7,071,867 B2 | 7/2006 | Wittenberg et al. ............. 342/70 |
| 7,079,925 B2 | 7/2006 | Kubota et al. ..................... 701/1 |
| 7,095,360 B2 | 8/2006 | Kuji et al. ....................... 342/29 |
| 7,102,570 B2 | 9/2006 | Bar-On et al. ................ 342/465 |
| 7,106,212 B2 | 9/2006 | Konishi et al. ................ 340/905 |
| 7,109,889 B2 | 9/2006 | He ............................... 340/971 |
| 7,117,089 B2 | 10/2006 | Khatwa et al. ................ 701/301 |
| 7,120,537 B2 | 10/2006 | Flynn et al. .................. 701/120 |
| 7,123,169 B2 | 10/2006 | Farmer et al. ................ 340/945 |
| 7,123,192 B2 | 10/2006 | Smith et al. .................. 342/455 |
| 7,126,534 B2 | 10/2006 | Smith et al. .................. 342/456 |
| 7,136,059 B2 | 11/2006 | Kraus et al. ................... 345/419 |
| 7,142,154 B2 | 11/2006 | Quilter et al. ............. 342/357.06 |
| 7,148,816 B1 | 12/2006 | Carrico ........................ 340/961 |
| 7,155,240 B2 | 12/2006 | Atkinson et al. ............ 455/456.2 |
| 7,164,986 B2 | 1/2007 | Humphries et al. ........... 701/207 |
| 7,170,441 B2 | 1/2007 | Perl et al. ....................... 342/29 |
| 7,170,820 B2 | 1/2007 | Szajnowski ................... 367/127 |
| 7,187,327 B2 | 3/2007 | Coluzzi et al. ................ 342/458 |
| 7,190,303 B2 | 3/2007 | Rowlan .......................... 342/29 |

| | | | | | | |
|---|---|---|---|---|---|---|
| 7,196,621 B2 | 3/2007 | Kochis | 340/539.13 | 2006/0167598 A1 | 7/2006 | Pennarola | 701/11 |
| 7,206,698 B2 | 4/2007 | Conner et al. | 701/301 | 2006/0181447 A1 | 8/2006 | Kuji et al. | 342/32 |
| 7,218,276 B2 | 5/2007 | Teranishi | 342/357.1 | 2006/0191326 A1 | 8/2006 | Smith et al. | 73/73 |
| 7,218,278 B1 | 5/2007 | Arethens | 342/367.03 | 2006/0208924 A1 | 9/2006 | Matalon | 340/933 |
| 7,221,308 B2 | 5/2007 | Burton et al. | 342/42 | 2006/0262014 A1 | 11/2006 | Shemesh et al. | 342/386 |
| 7,228,207 B2 | 6/2007 | Clarke et al. | 701/3 | 2006/0265664 A1 | 11/2006 | Simons et al. | 715/722 |
| 7,233,545 B2 | 6/2007 | Harvey, Jr. et al. | 367/127 | 2006/0276201 A1 | 12/2006 | Dupray | 455/456.1 |
| 7,248,963 B2 | 7/2007 | Baiada et al. | 701/120 | 2007/0001903 A1 | 1/2007 | Smith et al. | 342/387 |
| 7,250,901 B2 | 7/2007 | Stephens | 342/146 | 2007/0040734 A1 | 2/2007 | Evers et al. | 342/126 |
| 7,257,469 B1 | 8/2007 | Pemble | 701/3 | 2007/0060079 A1 | 3/2007 | Nakagawa et al. | 455/131 |
| 7,272,495 B2 | 9/2007 | Coluzzi et al. | 701/207 | 2007/0090295 A1 | 4/2007 | Parkinson et al. | 250/349 |
| 7,277,052 B2 | 10/2007 | Delaveau et al. | 342/387 | 2007/0106436 A1 | 5/2007 | Johansson | 701/23 |
| 7,286,624 B2 | 10/2007 | Woo et al. | 375/356 | 2007/0109184 A1 | 5/2007 | Shyr et al. | 342/357.06 |
| 7,307,578 B2 | 12/2007 | Blaskovich et al. | 342/29 | 2007/0159356 A1 | 7/2007 | Borel et al. | 340/945 |
| 7,308,343 B1 | 12/2007 | Horvath et al. | 701/3 | 2007/0159378 A1 | 7/2007 | Powers et al. | 342/29 |
| 7,321,813 B2 | 1/2008 | Meunier | 701/10 | 2007/0182589 A1 | 8/2007 | Tran | 340/961 |
| 7,333,052 B2 | 2/2008 | Maskell | 342/195 | 2007/0213887 A1 | 9/2007 | Woodings | 701/1 |
| 7,333,887 B2 | 2/2008 | Baiada et al. | 701/120 | 2007/0222665 A1 | 9/2007 | Koeneman | 342/29 |
| 7,352,318 B2 | 4/2008 | Osman et al. | 342/37 | 2007/0250259 A1 | 10/2007 | Dare | 701/201 |
| 7,358,854 B2 | 4/2008 | Egner et al. | 340/539.13 | 2007/0252750 A1 | 11/2007 | Jean et al. | 342/40 |
| 7,379,165 B2 | 5/2008 | Anderson et al. | 356/5.05 | 2007/0298786 A1 | 12/2007 | Meyers et al. | 455/431 |
| 7,382,286 B2 | 6/2008 | Cole et al. | 340/961 | 2008/0027596 A1 | 1/2008 | Conner et al. | 701/16 |
| 7,383,104 B2 | 6/2008 | Ishii et al. | 701/3 | 2008/0042880 A1 | 2/2008 | Ramaiah et al. | 340/958 |
| 7,383,124 B1 | 6/2008 | Vesel | 701/200 | 2008/0042902 A1 | 2/2008 | Brandwood et al. | 342/465 |
| 7,385,527 B1 | 6/2008 | Clavier et al. | 340/945 | 2008/0062011 A1 | 3/2008 | Butler et al. | 340/961 |
| 7,391,359 B2 | 6/2008 | Ootomo et al. | 342/37 | 2008/0063123 A1 | 3/2008 | De Mey et al. | 375/350 |
| 7,398,157 B2 | 7/2008 | Sigurdsson et al. | 701/213 | 2008/0068250 A1 | 3/2008 | Brandao et al. | 342/30 |
| 7,400,297 B2 | 7/2008 | Ferreol et al. | 342/377 | 2008/0088508 A1 | 4/2008 | Smith | 342/453 |
| 7,408,497 B2 | 8/2008 | Billaud et al. | 342/30 | 2008/0010643 A1 | 5/2008 | Clark et al. | 340/972 |
| 7,408,498 B2 | 8/2008 | Kuji et al. | 342/37 | 2008/0106457 A1 | 5/2008 | Bartolini et al. | 342/40 |
| 7,420,501 B2 | 9/2008 | Perl | 342/37 | 2008/0109343 A1 | 5/2008 | Robinson et al. | 705/37 |
| 7,430,218 B2 | 9/2008 | Lee et al. | 370/464 | 2008/0117106 A1 | 5/2008 | Sarno et al. | 342/444 |
| 7,437,225 B1 | 10/2008 | Rathinam | 701/14 | 2008/0120032 A1 | 5/2008 | Brandao et al. | 701/300 |
| 7,440,846 B2 | 10/2008 | Irie et al. | 701/200 | 2008/0129601 A1 | 6/2008 | Thomas | 342/465 |
| 7,457,690 B2 | 11/2008 | Wilson, Jr. | 701/3 | 2008/0132270 A1 | 6/2008 | Basir | 455/550.1 |
| 7,460,866 B2 | 12/2008 | Salkini et al. | 455/431 | 2008/0137524 A1 | 6/2008 | Anderson et al. | 370/203 |
| 7,460,871 B2 | 12/2008 | Humphries et al. | 455/456.1 | 2008/0150784 A1 | 6/2008 | Zhang et al. | 342/30 |
| 7,477,145 B2 | 1/2009 | Tatton et al. | 340/531 | 2008/0158040 A1 | 7/2008 | Stayton et al. | 342/32 |
| 7,479,919 B2 | 1/2009 | Poe et al. | 342/30 | 2008/0158059 A1 | 7/2008 | Bull et al. | 342/387 |
| 7,479,922 B2 | 1/2009 | Hunt et al. | 342/357.02 | 2008/0174472 A1 | 7/2008 | Stone et al. | 342/30 |
| 7,479,923 B2 | 1/2009 | Carpenter | 342/357.02 | 2008/0183344 A1 | 7/2008 | Doyen et al. | 701/9 |
| 7,479,925 B2 | 1/2009 | Schell | 342/455 | 2008/0186224 A1 | 8/2008 | Ichiyanagi et al. | 342/109 |
| 7,487,108 B2 | 2/2009 | Aoki et al. | 705/13 | 2008/0186231 A1 | 8/2008 | Aljadeff et al. | 342/387 |
| 7,501,977 B2 | 3/2009 | Ino | 342/37 | 2008/0195309 A1 | 8/2008 | Prinzel, III et al. | 701/208 |
| 7,504,996 B2 | 3/2009 | Martin | 342/357.12 | 2008/0231494 A1 | 9/2008 | Galati | 342/37 |
| 7,515,715 B2 | 4/2009 | Olive | 380/255 | 2008/0252528 A1 | 10/2008 | Shen et al. | 342/451 |
| 2001/0014847 A1 | 8/2001 | Keenan | 701/117 | 2008/0266166 A1 | 10/2008 | Schuchman | 342/97 |
| 2001/0026240 A1 | 10/2001 | Neher | 342/357.07 | 2008/0272227 A1 | 11/2008 | Sharpe | 244/3.16 |
| 2002/0021247 A1 | 2/2002 | Smith et al. | 342/450 | 2008/0275642 A1 | 11/2008 | Clark et al. | 701/208 |
| 2002/0089433 A1 | 7/2002 | Bateman et al. | 340/970 | 2008/0294306 A1 | 11/2008 | Huynh et al. | 701/3 |
| 2002/0152029 A1 | 10/2002 | Sainthuile et al. | 701/301 | 2008/0297398 A1 | 12/2008 | Kamimura | 342/38 |
| 2003/0009267 A1 | 1/2003 | Dunsky et al. | 701/4 | 2009/0005960 A1 | 1/2009 | Roberts et al. | 701/120 |
| 2003/0097216 A1 | 5/2003 | Etnyre | 701/216 | 2009/0009357 A1 | 1/2009 | Heen et al. | 340/825.09 |
| 2003/0152248 A1 | 8/2003 | Spark et al. | 382/103 | 2009/0012660 A1 | 1/2009 | Roberts et al. | 701/3 |
| 2003/0158799 A1 | 8/2003 | Kakihara et al. | 705/30 | 2009/0012661 A1 | 1/2009 | Louis | 701/9 |
| 2004/0002886 A1 | 1/2004 | Dickerson et al. | | 2009/0015471 A1 | 1/2009 | Shen et al. | 342/357.15 |
| 2004/0004554 A1 | 1/2004 | Srinivasan et al. | 340/870.01 | 2009/0027270 A1 | 1/2009 | Fisher et al. | 342/387 |
| 2004/0039806 A1 | 2/2004 | Miras | 709/223 | 2009/0051570 A1 | 2/2009 | Clark et al. | 340/971 |
| 2004/0044463 A1 | 3/2004 | Shen-Feng et al. | 701/120 | 2009/0055038 A1 | 2/2009 | Garrec et al. | 701/17 |
| 2004/0086121 A1 | 5/2004 | Viggiano et al. | 380/255 | | | | |
| 2004/0094622 A1 | 5/2004 | Vismara | 235/384 | | | | |
| 2004/0210371 A1 | 10/2004 | Adachi et al. | 701/50 | | | | |
| 2004/0225432 A1 | 11/2004 | Pilley et al. | 701/117 | | | | |
| 2004/0266341 A1 | 12/2004 | Teunon | 455/12.1 | | | | |
| 2005/0007272 A1 | 1/2005 | Smith et al. | 342/189 | | | | |
| 2005/0021283 A1 | 1/2005 | Brinton et al. | 702/150 | | | | |
| 2005/0046569 A1 | 3/2005 | Spriggs et al. | 340/551 | | | | |
| 2005/0057395 A1 | 3/2005 | Atkinson | | | | | |
| 2005/0159170 A1 | 7/2005 | Puranik et al. | 455/456.1 | | | | |
| 2005/0166672 A1 | 8/2005 | Atkinson | 73/290 | | | | |
| 2005/0192717 A1 | 9/2005 | Tafs et al. | 701/3 | | | | |
| 2005/0228715 A1 | 10/2005 | Hartig et al. | 705/1 | | | | |
| 2005/0231422 A1 | 10/2005 | Etnyre | 342/182 | | | | |
| 2006/0023655 A1 | 2/2006 | Engel et al. | 370/328 | | | | |
| 2006/0044184 A1 | 3/2006 | Kimura | 342/357.09 | | | | |
| 2006/0052933 A1 | 3/2006 | Ota | 701/200 | | | | |
| 2006/0119515 A1 | 6/2006 | Smith | 342/450 | | | | |
| 2006/0129310 A1 | 6/2006 | Tarrant et al. | 701/201 | | | | |
| 2006/0161340 A1 | 7/2006 | Lee | 701/207 | | | | |

FOREIGN PATENT DOCUMENTS

| | | |
|---|---|---|
| DE | 4204164 A1 | 8/1993 |
| DE | 19751092 A1 | 6/1999 |
| DE | 10149006 A1 | 4/2003 |
| DE | 202004007747 U1 | 9/2004 |
| DE | 202006005089 U1 | 6/2006 |
| DE | 102006009121 A1 | 8/2007 |
| EP | 0265902 A2 | 5/1988 |
| EP | 0346461 A1 | 12/1989 |
| EP | 0514826 A1 | 11/1992 |
| EP | 0550073 A2 | 7/1993 |
| EP | 0574009 A3 | 6/1994 |
| EP | 0613110 A1 | 8/1994 |
| EP | 0613111 A1 | 8/1994 |
| EP | 0614092 A1 | 9/1994 |
| EP | 0629877 A1 | 12/1994 |
| EP | 0355336 B1 | 8/1995 |
| EP | 0670566 A2 | 9/1995 |
| EP | 0682332 A1 | 11/1995 |

| | | | | | | |
|---|---|---|---|---|---|---|
| EP | 0505827 | B1 | 6/1996 | JP | 6-342061 A | 12/1994 |
| EP | 0385600 | B1 | 7/1996 | JP | 8-146130 A | 5/1996 |
| EP | 0732596 | A2 | 9/1996 | JP | 9-119983 A | 11/1996 |
| EP | 0487940 | B1 | 1/1997 | WO | WO9205456 A1 | 4/1992 |
| EP | 0774148 | A1 | 5/1997 | WO | WO9427161 A1 | 11/1994 |
| EP | 0578316 | B1 | 4/1998 | WO | WO9428437 A1 | 12/1994 |
| EP | 0915349 | A1 | 5/1999 | WO | WO9503598 A1 | 2/1995 |
| EP | 1022580 | A3 | 2/2001 | WO | WO9521388 A1 | 8/1995 |
| EP | 1118871 | A2 | 7/2001 | WO | WO9605562 A1 | 2/1996 |
| EP | 0877997 | B1 | 12/2001 | WO | WO9635961 A1 | 11/1996 |
| EP | 0778470 | B1 | 5/2002 | WO | WO9726552 A2 | 7/1997 |
| EP | 1202233 | A1 | 5/2002 | WO | WO9747173 A2 | 12/1997 |
| EP | 0865004 | B1 | 7/2002 | WO | WO9804965 A2 | 2/1998 |
| EP | 1109032 | B1 | 3/2003 | WO | WO9805977 A1 | 2/1998 |
| EP | 1300689 | A2 | 4/2003 | WO | WO9814926 A1 | 4/1998 |
| EP | 1331620 | A1 | 7/2003 | WO | WO9822834 A1 | 5/1998 |
| EP | 1345044 | A1 | 9/2003 | WO | WO9822923 A1 | 5/1998 |
| EP | 1369704 | A1 | 12/2003 | WO | WO9835311 A1 | 8/1998 |
| EP | 1302920 | B1 | 2/2004 | WO | WO9843107 A1 | 10/1998 |
| EP | 1396832 | A1 | 3/2004 | WO | WO9849654 A1 | 11/1998 |
| EP | 1406228 | A2 | 4/2004 | WO | WO9908251 A1 | 2/1999 |
| EP | 1070968 | B1 | 5/2004 | WO | WO9935630 A1 | 7/1999 |
| EP | 1431946 | A1 | 6/2004 | WO | WO9942855 A1 | 8/1999 |
| EP | 1467575 | A1 | 10/2004 | WO | WO9945519 A2 | 9/1999 |
| EP | 0903589 | B1 | 11/2004 | WO | WO9950985 | 10/1999 |
| EP | 1517281 | A2 | 3/2005 | WO | WO9956144 A1 | 11/1999 |
| EP | 1531340 | A1 | 5/2005 | WO | WO0023816 A1 | 4/2000 |
| EP | 0926510 | B1 | 8/2005 | WO | WO0039775 A2 | 7/2000 |
| EP | 1405286 | B1 | 9/2005 | WO | WO0111389 A1 | 2/2001 |
| EP | 1485730 | B1 | 9/2005 | WO | WO0133302 A2 | 5/2001 |
| EP | 1428195 | B1 | 10/2005 | WO | WO0148652 A1 | 7/2001 |
| EP | 1603098 | A1 | 12/2005 | WO | WO0157550 A1 | 8/2001 |
| EP | 1125415 | B1 | 1/2006 | WO | WO0159601 A1 | 8/2001 |
| EP | 1205732 | B1 | 3/2006 | WO | WO0163239 A1 | 8/2001 |
| EP | 1632787 | A1 | 3/2006 | WO | WO0165276 A1 | 9/2001 |
| EP | 1632892 | A2 | 3/2006 | WO | WO0186319 | 11/2001 |
| EP | 0953261 | B1 | 6/2006 | WO | WO0194969 A2 | 12/2001 |
| EP | 1275975 | B1 | 6/2006 | WO | WO0205245 A2 | 1/2002 |
| EP | 1285232 | B1 | 6/2006 | WO | WO0208784 A1 | 1/2002 |
| EP | 1672384 | A2 | 6/2006 | WO | WO0215151 A1 | 2/2002 |
| EP | 0987562 | B1 | 7/2006 | WO | WO0227275 A2 | 4/2002 |
| EP | 1093564 | B1 | 11/2006 | WO | WO02054103 A2 | 7/2002 |
| EP | 1218694 | B1 | 11/2006 | WO | WO02059838 A2 | 8/2002 |
| EP | 1727094 | A2 | 11/2006 | WO | WO02066288 A1 | 8/2002 |
| EP | 1742170 | A1 | 1/2007 | WO | WO02069300 A1 | 9/2002 |
| EP | 1188137 | B1 | 2/2007 | WO | WO02075667 A1 | 9/2002 |
| EP | 1755356 | A1 | 2/2007 | WO | WO02091312 A2 | 11/2002 |
| EP | 1463002 | B1 | 4/2007 | WO | WO02095709 A1 | 11/2002 |
| EP | 1361555 | B1 | 5/2007 | WO | WO02099769 | 12/2002 |
| EP | 1798572 | A1 | 6/2007 | WO | WO03013010 A1 | 2/2003 |
| EP | 1410364 | B1 | 10/2007 | WO | WO03016937 A1 | 2/2003 |
| EP | 1843161 | A2 | 10/2007 | WO | WO03023439 A2 | 3/2003 |
| EP | 1860456 | A1 | 11/2007 | WO | WO03027934 A1 | 4/2003 |
| EP | 1884462 | A1 | 2/2008 | WO | WO03054830 A2 | 7/2003 |
| EP | 1101385 | B1 | 3/2008 | WO | WO03056495 A1 | 7/2003 |
| EP | 1901090 | A1 | 3/2008 | WO | WO03060855 A1 | 7/2003 |
| EP | 0964268 | B1 | 4/2008 | WO | WO03067281 A1 | 8/2003 |
| EP | 1483755 | B1 | 4/2008 | WO | WO03079136 A2 | 9/2003 |
| EP | 1906204 | A2 | 4/2008 | WO | WO03081560 A1 | 10/2003 |
| EP | 1912077 | A2 | 4/2008 | WO | WO03093775 A2 | 11/2003 |
| EP | 1331490 | B1 | 6/2008 | WO | WO03096282 A1 | 11/2003 |
| EP | 1942351 | A1 | 7/2008 | WO | WO03098576 A1 | 11/2003 |
| EP | 1327159 | B1 | 8/2008 | WO | WO03107299 A2 | 12/2003 |
| EP | 1436641 | B1 | 8/2008 | WO | WO2004042418 A1 | 5/2004 |
| EP | 1953565 | A1 | 8/2008 | WO | WO2004068162 A2 | 8/2004 |
| EP | 1483902 | B1 | 9/2008 | WO | WO2004109317 A2 | 12/2004 |
| EP | 1965219 | A1 | 9/2008 | WO | WO2004114252 A1 | 12/2004 |
| EP | 1972962 | A2 | 9/2008 | WO | WO2005038478 A2 | 4/2005 |
| EP | 1975884 | A1 | 10/2008 | WO | WO2005052887 A1 | 6/2005 |
| EP | 1118011 | B1 | 11/2008 | WO | WO2005081012 A1 | 9/2005 |
| EP | 1995708 | A1 | 11/2008 | WO | WO2005081630 A2 | 9/2005 |
| EP | 2000778 | A2 | 12/2008 | WO | WO2005114613 A1 | 12/2005 |
| EP | 2001004 | A2 | 12/2008 | WO | WO2005121701 A2 | 12/2005 |
| EP | 2023155 | A1 | 2/2009 | WO | WO2005017555 A2 | 5/2006 |
| FR | 2708349 | A1 | 2/1995 | WO | WO2006070207 A1 | 7/2006 |
| FR | 2791778 | A1 | 10/2000 | WO | WO2006079165 A1 | 8/2006 |
| FR | 2881841 | A1 | 8/2006 | WO | WO2006093682 A2 | 9/2006 |
| JP | 9-288175 | A | 11/1994 | WO | WO2006108275 A1 | 10/2006 |
| JP | 6-342061 | A | 12/1994 | WO | WO2006110973 A1 | 10/2006 |

| | | | |
|---|---|---|---|
| WO | WO2006135916 A1 | 12/2006 |
| WO | WO2006135923 A2 | 12/2006 |
| WO | WO2007001660 A2 | 1/2007 |
| WO | WO2007010116 A1 | 1/2007 |
| WO | WO2007012888 A1 | 2/2007 |
| WO | WO2007013069 A1 | 2/2007 |
| WO | WO2007048237 A1 | 5/2007 |
| WO | WO2007086899 A2 | 8/2007 |
| WO | WO2006088554 A1 | 9/2007 |
| WO | WO2007113469 A1 | 10/2007 |
| WO | WO2007115246 A1 | 10/2007 |
| WO | WO2007120588 A2 | 10/2007 |
| WO | WO2007124300 A2 | 11/2007 |
| WO | WO2008001117 A1 | 1/2008 |
| WO | WO2008005012 A1 | 1/2008 |
| WO | WO2008012377 A1 | 1/2008 |
| WO | WO2008018088 A1 | 2/2008 |
| WO | WO2008051292 A2 | 5/2008 |
| WO | WO2008053173 A1 | 5/2008 |
| WO | WO2008065328 A2 | 6/2008 |
| WO | WO2008065658 A1 | 6/2008 |
| WO | WO2008068679 A1 | 6/2008 |
| WO | WO2008093036 A2 | 8/2008 |
| WO | WO2008116580 A1 | 10/2008 |
| WO | WO2008126126 A2 | 10/2008 |
| WO | WO2008144784 A1 | 12/2008 |
| WO | WO2008145986 A2 | 12/2008 |
| WO | WO2009001294 A2 | 12/2008 |
| WO | WO2009004381 A1 | 1/2009 |

OTHER PUBLICATIONS

Method to Provide System-Wide ADS-B Back-Up, Validation, and Security, A. Smith et al. 25th AIAA/IEEE Digital Avionics Systems Conference, Oct. 15, 2006.
*Positive Identification of Aircraft on Surface Movement Area—Results of FAA Trials*, 10th Annual International AeroSense Symposium, Orlando, Florida, Apr. 1996.
*Surveillance Monitoring of Parallel Precision Approaches in a Free Flight Environment*, AIAA 16th Annual Digital Avionics Systems Conference, Oct. 1997.
*Analysis of ADS-B, ASDE-3 and Multilateration Surveillance Performance*—NASA Atlanta Demonstration Presented at the AIAA 17th Annual Digital Avionics Systems Conference in Oct. 1998.
*Application of ADS-B for Airport Surface Surveillance*, Daniel Hicok, Derrick Lee IEEE AIAA 17th Annual Digital Avionics Conference, 1998.
*Atlanta Hartsfield International Airport—Results of FAA Trials to Accurately Locate/Identify Aircraft on the Airport Movement Area*, IEEE Plans, Atlanta, GA, Apr. 1996.
*Evaluation of Airport Surface Surveillance Technologies*, IEEE Radar 96 conference, Beijing, China, Oct. 1996.
*Improved Location/Identification of Aircraft/Ground Vehicles on Airport Movement Areas—Results of FAA Trials*, Institute of Navigation in Santa Monica, CA, Jan. 1996.
*Sensis News*, http://www.sensis.com/docs/128/ © 1999-2006.
*Roke RADAR, Design and development of miniature radars and fuze sensors through to major radar programme builds*, http://www.roke.co.uk/skills/radar/, © 2006.
*Acoustic System for Aircraft Detection and Tracking, based on Passive Microphone Arrays*. Caronna, Rosello, Testa, 148th Meeting of the Acoustical Society of America, http://pcfite.ing.uniroma1.it/upload/research/4psp711079482021710.pdf Nov. 2004.
*Cel-Loc How We Do it, Technology Overview*, http://www.cell-loc.com/how_tech.html, Oct. 2, 2006 (original date unknown).
*Super-Radar, Done Dirt Cheap*, http://www.businessweek.com/magazine/content/03_42/b3854113.htm BusinessWeek Online, Oct. 20, 2003.
*Methods to Provide System-Wide ADS-B Back-Up, Validation and Security*, A. Smith, R. Cassell, T. Breen, R. Hulstrom, C. Evers, 25th AIAA/IEEE Digital Avionics Systems Conference, Oct. 15, 2006.
Damarel Systems International, Ltd, Travel Automation Specialists, © 2004, www.dameral.com.
Airfield Pavement Computer Software, Mar. 23, 2005, Transport Canada https://www.tc.gc.ca/CivilAviation/International/Technical/Pavement/software.htm.

ARA Transportation, © 2004, http://www.araworldwide.com/expertise/industry/transportation.htm.
*The Twilight Zone, Can Wide-Area Multilateration Systems Become A Nightmare for MSSR Producers*? Aircraft Traffic Technology International 2005, Vladimir Manda, Viktor Sotona.
*Safety, Performance, and Interoperability Requirements Document for ADS-B NRA Application*, European Organisation for Civil Avaiation Equipment, Dec. 2005.
Passive Surveillance Using Multilateration, Roke Manor Research website (2003).
Letter from Marc Morgan, SIEMENS, Feb. 10, 2006.
*Required Navigation Performance (RNP) and Area Navigation (RNAV)*, Boeing, Aug. 2000.
*System-Wide ADS-8 Back-Up and Validation*, A. Smith, R. Cassell, T. Breen, R. Hulstrom, C. Evers, 2006 Integrated Communications, Navigation, and Surveillance Conference.
Required Navigation Performance (RNP) Another step towards global implementation of CNS/ATM, Anita Trotter-Cox, Assessment Compliance Group, Inc. Published in Professional Pilot Magazine, Jun. 1999.
Traffic Alert System Technical Design Summary, Final Report, Apr. 1994 (Baldwin et al.).
AIRSCENE, The complete Air Traffic Picture in Real Time, www.airscene.com, Rannoch Corporation, Alexandria, Virginia, undated.
GPS Relative Accuracy for Collision Avoidance, Institute of Navigation Technical Meeting, Jan. 1997 (Rudel et al.).
Cassell, R., Smith A., Cohen, B., Yang, E., Sleep, B., A Prototype Aircraft Performance Risk Assessment Model, Final Report, Rannoch Corporation, Feb. 28, 2002.
Cassell, R., Smith A., Cohen, B., Yang, E., Sleep, B., Esche, J., Aircraft Performance Risk Assessment Model (APRAM), Rannoch Corporation, Nov. 30, 2002.
Cox, E., A., Fuzzy Logic For Business and Industry, Charles River Media, 1995, Chapter 5.
Smith, A., Cassell, R., Cohen, B., An approach to Aircraft Performance Risk Assessment Modeling, Final Report, Rannoch Corporation, Mar. 1999.
M.L. Wood and R. W. Bush, "Multilateration on Mode S and ATCRBS Signals at Atlanta's Hartsfield Airport", Lincoln Laboratory, M.I.T., Jan. 8, 1998.
AERMOD: Description of Model Formulation (Version 02222) EPA 454/R-02-002d, Oct. 21, 2002.
FAA Integrated Noise Model, www.faa.gov, current release INM 6.1 (Mar. 4, 2003).
"Flight Explorer News: Flight Explorer and Lochard Team to Provide Enhanced Flight Tracking for Cutomers Worldwide", Apr. 28, 2003, http://www.flightexplorer/com/News/press%20releases/pr042803.asp.
Source Code received by Rannoch Corp. from FAA, circa 1998.
"A Routine that converts an American Mode S address into its corresponding 'N' number string", Ken Banis, Feb. 17, 1992/.
"Description of the U.S. Algorithm for Assigning Mode A Addresses", Robert D. Grappel, M.I.T. Lincoln Laboratory, Nov. 1991.
"Program to convert Mode S address to U.S. Tail Number", R.D. Grappel, M.I.T. Lincoln Laboratory, 1991.
"Program to convert U.S. aircraft tail numbers to Mode S code", R.D. Grappel, M.I.T. Lincoln Laboratory, 1991.
"ADSE and Multilateration Mode-S Data Fusion for Location and Identification on Airport Surface", J.G. Herraro J.A. Portas, F.J. Rodriguez,(*IEEE 1999 Radar Conference Proceedings*, pp. 315-320, Apr. 20-22, 1999).
D.C. Rickard, D.J.Sherry, S.J.Taylor, "The development of a prototype aircraft-height monitoring unit utilising an SSR-based difference in time of arrival technique", International Conference Radar 92 (Conf. Publ. No. 365), 1992, p. 250-3.
D. E. Manolakis and C. C. Lefas, "Aircraft geometric height computation using secondary surveillance radar range differences," IEE Proceedings-F, Radar, Sonar, Navigation, vol. 141, No. 2, pp. 139-148, 1994.
Request for Proposal for Acquisition of Airport Noise and Operations Monitoring System (NOMS), Indianapolis Airport Authority, Oct. 21, 2003.

Technical Specifications, for a Aircraft Flight Track and Noise Management System for the Regional Airport Authority of Louisville and Jefferson County Prepared by: Harris Miller Miller & Hanson Inc. 15 New England Executive Park Burlington, MA 01803 HMMH Report No. 298950, May 16, 2003.

Application of CNS/ATM Technologies to Airport Management, Alex Smith & Jon Baldwin, Rannoch Corporation, 1800 Diagonal Rd, Suite 430, Alexandria, VA 22314, USA (undated).

"Overview of the FAA ADS-B Link Decision", John Scardina, Director, Office of System Architecture and Investment Analysis, Federal Aviation Administration, Jun. 7, 2002.

Automated Correlation of Aircraft Flight Tracks and Events with ATC Data, Alex Smith, Rannoch Corporation, 1800 Diagonal Rd, Suite 430, Alexandria, VA 22314, USA (undated).

"Ground-Based Transceiver (GBT) For Broadcast Services Using the Universal Access Transceiver (UAT) Data Link", FAA-E-2973, Department of Transportation, Federal Aviation Administration, Jan. 15, 2004.

"The Future of Alerts ADS-B Seminar", Mark Palm, Thales Melbourne, Thales Air Systems Division, undated.

"Wide Area Multilateration Report on EATMP TRS 131/04 Version 1.1", NLR-CR-2004-472, Roke Manor Research, Nov. 2004.

J.G. Herrero, J. A. B. Portas, F.J.J. Rodriguez, J.R.C. Corredera, ASDE and Multilateration Mode-S Data Fusion for Location and Identification on Airport Surface, (*IEEE 1999 Radar Conf. Proc.*, pp. 315-320, Apr. 20-22, 1999).

D.C. Rickard, D.J. Sherry, S.J. Taylor, The development of a prototype aircraft-height monitoring unit utilizing an SSR-based difference in time of arrival technique, Int'l Conference Radar 92 (Conf. Publ. No. 365), 1992, p. 250-3.

D. E. Manolakis and C. C. Lefas, Aircraft geometric height computation using secondary surveillance radar range differences,□ IEE Proceedings-F, Radar, Sonar, Navigation, vol. 141, No. 2, pp. 139-148, 1994.

GPS Risk Assessment Study, Final Report, T.M. Corrigan et al., Johns Hopkins university, Applied Physics Laboratory, Jan. 1999.

A New Positioning System Using Television Synchronization Signals, Matthew Rabinowitz et al., (undated).

Radio Wave Propogation, Lecture #6, Kamran Ahmed, undated.

Aircraft Noise Report, vol. 17, No. 1, Jan. 31, 2005.

ASA MASPS—Change Issue, James Maynard, Oct. 21, 2002.

ADS-B, Automatic Dependent Surveillance—Broadcast Will ADS-B Increase Safety and Security for Aviation?, First written Mar. 1999 revised Jul. 2000, by Darryl H. Phillips AirSport Corporation—1100 West Cherokee—Sallisaw OK 74955 voice: 918-775-4010—fax: 918-775-4000.

ASA MASPS—Change Issue, Greg Stayton, Aug. 1, 2002.
ASA MASPS—Change Issue, Michael Petri, Oct. 23, 2002.
ASA MASPS—Change Issue, J. Stuart Searight, Nov. 18, 2002.
ASA MASPS—Change Issue, Michael Petri, Dec. 16, 2002.
ASA MASPS—Change Issue, J. Stuart Searight, Jan. 23, 2003.
ASA MASPS—Change Issue, Tony Warren, Feb. 3, 2003.
ASA MASPS—Change Issue, Steve George, Apr. 23, 2003.
ASA MASPS—Change Issue, James Maynard, Apr. 23, 2003.
ASA MASPS—Change Issue, T.E. Foster, Jun. 11, 2003.
ASA MASPS—Change Issue, Jonathan Hammer et al., Jan. 13, 2004.
ASA MASPS—Change Issue, Tom Mosher, Jan. 13, 2004.
ASA MASPS—Change Issue, Mike Castle, Feb. 13, 2004.
ASA MASPS—Change Issue, Tony Warren, Sep. 10, 2004.
ASA MASPS—Change Issue, Mike Castle, Sep. 10, 2004.
ASA MASPS—Change Issue, Bob Smith, Sep. 1, 2004.
ASA MASPS—Change Issue, Heleberg and Kaliardos, Oct. 15, 2004.
ASA MASPS—Change Issue, Taji Shafaat, Sep. 19, 2004.
ASA MASPS—Change Issue, Stuart Searight, Nov. 3, 2004.

A Radar Substitute—David Hughes, Aviation Week & Space Technology, Mar. 7, 2005.

Statement of ACI-NA and AAAE on Airport Improvement Program Reauthorization before the Senate Aviation Subcommittee on Feb. 12, 1998. David Plavin.

AEROWARE Airport Management Software, AEROWARE, P.O. Box 220046 Kirkwood, MO 63122, undated.

Draft Proposal for the Amendment of the Sub-Cap on Off-Peak Takeoff and Landing Charges at Dubun Airport, Commission for Aviation Regulation, Nov. 23, 2003.

Aviation Infrastructure: Challenges Associated with Building and Maintaining Runways, General Accounting Office, GAO-01-90-T, Oct. 5, 2000.

Airfield Pavement: Keeping Nations Runways in Good Condition Could Require Substantially higher Spending, GAO/RCED-98-226, Jul. 1998.

Albany International Airport Pavement Management System, Albany, New York, Albany International Airport GIS-Based Pavement and Facilities Management, Fall, 2002.

Albany International Airport, New York, Uses GIS for Pavement Management, Lena Weber, Ph.D., GIS Manager, and Pat Rooney, GIS/GPS Technician, C.T. Male Associates, Summer, 2002, http://www.esri.com/news/arcnews/summer02articles/albany-airport.html.

Dynatest Airports PMS, Dynatest International Rev. 040101-9, www.dynatest.com.

Micropaver, Dr. M.Y. Shahin, CECER-CFF Champaign, IL May 2, 2005.

Raytheon Systems Limited Launches a Unique Solution for ADS-B,. Jan. 19, 2005, Raytheon Corp. http://www.raytheon.co.uk/highlights/ATMS.html.

Raytheon Systems Liminted's ADS-B Solution Prised by International SIR Tzraffic Authorities, Feb. 2, 2005, http://www.raytheon.co.uk/news_room/news/press_02022005.pdf.

http://www.airsysatm.thomson-csf.com/products/NAV/ads_h.htm.
http://www.eurocontol.be/care/asas/tn-workshop1/asas-tn-vanderkraan2.ppt.
http://www.eurocontrol.be/care/asas/tn-workshop1/asas-tn-howlett.ppt.

Boeing Subsidary and Megadata Announce Joint Marketing Agreement, Press Release, Aug. 7, 2003.

www.rtel.com realtime Market Information, "Baggage Modelling to Improve the Business Passenger Experience" (undated).

Switch, Airport Core Product Description (undated).

Federal Airways & Airspace, Inc. Because Accuracy Matters, Feb. 2003, Jan. 2002.

Protest Letter dated May 16, 2002 from Otto M. Wildensteiner, U.S. Department of Transportation, Washington, DC.

"Comparison of Claims in U.S. Appl. No. 09/971,672 with Prior Art", May 16, 2002, Otto M. Wildensteiner, Department of Transportation, Washington, DC.

"Minimum Aviation System Performance Standards for Automatic Dependent Surveillance Broadcast (ADS-B)", RCTA, Inc. Washington, DC, © 1998.

"Runway Incursion Reduction Program Dallas-Ft. Worth Formal Evaluation Report, Final Report", Trios Associates, Inc. Dec. 21, 2000.

"TIS-B DFW Application for Airport Surface Situational Awareness", Trios Associates, Inc., Sep. 6, 2000.

"A Prototype Transceiver for Evaluating An Integrated Broadcast Data Link Architecture", Chris Moody & Warrent Wilson, RCTA SC-186, Aug. 17, 1995, RTCA Paper No. 449-95/SC186-033.

"The Universal Access Tranceiver (UAT)", Warren Wilson & Chris Moody, May 10, 1995.

"Terminal Area Productivity (TAP) Study Low Visibility Landing and Surface Operations (LVLASO) Demonstration Report" Surface Surveillance Products Team (AND-410) Sep. 4, 1998.

"Phase I—Operational Evaluation Final Report Cargo Airline Association ADS-B Program, FAA SafeFlight 21 Program" Apr. 10, 2000.

"Capstone Program Plan Version 1.0", Federal Aviation Administration, Mar. 10, 1999.

"TIS-B Concept and Approach", MITRE, Chris Moody, Feb. 29, 2000.

"RTCA Special Commmittee 186, Working Group 5 ADS-B UAT MOPS Meeting #2, Proposed Contents and Transmission Rates for ADS-B Messages" Chris Moody, Mitre Corp., Feb. 20, 2001.

"Airborne Information Initiatives: Capitalizing on a Multi-Purpose Broadcast Communications Architecture", R.C. Strain, J.C. Moody, E.C. Hahn, B.E. Dunbar, S. Kavoussi, J.P. Mittelman, Digital Avionics Systems Conference, Oct. 1995.

"Minutes of SC-186 WG-2 (TIS-B) Meeting", Jun. 13-14, 2000.

Airport Pavement Management Systems: An Appraisal of Erxisting Methodologies, Michel Gendreau and Patrrick Soriano;Pergamon Transn Res. A, vol. 32, No. 3, pp. 187-214,1998.

*Components of a Pavement Maintenance Management System*, Mohamed Y. Shahin, U.S. Army Construction Engineering Research Laboratory, Transportaiton Research Record 791, pp. 31-39, 1980.

*Application of Markov Process to Pavement Management Systems at the Network Level*, Abbas Ahmad Butt, University of Iillinois at Urbana-Champaign (1991).

Need for Accurate Traffic Data in Pavement Management, John F. Kennedy International Airport Case Studt, Keegan, Handojo, Rada, Mactex Engineering and Consulting, Inc, 2004 FAA Worldwide Airport Technology Transfer Conference, Apr. 2004.

PCL system with illuminator of opportunity, Huaiying tan, Min ren, Bo lie, Jinning Song, Beijing Radar Instiitute, IEEE 0-7803-9582-4/06, Apr. 2006.

High Accurate Multiple Target Detection in PCL Radar Systems; Jafargholi, A. Mousavi, M. R. Nayebi, M. M. K. N. Toosi University of Technology Department of Electrical Engineering, Tehran, Iran; Radar, 2006. CIE '06. International Conference on, Oct. 2006, Shanghai, China; ISBN: 0-7803-9583-2.

Denial of bistatic hosting by spatial-temporal waveform design; H.D. Griffiths, M.G. Wicks, D. Weinder, R. Adve, P.A. Antonik, and I. Fotinopoulos, IEE Proc. Radar Sonar Navig., vol. 152, No. 2, Apr. 2005.

Passive coherent location FPGA implementation of the cross ambiguity function; Kvasnicka, M. Hermanek, A. Kunes, M. Pelant, M. Plsek, R., Proceedings- SPIE the International Society for Optical Engineering; 2006, vol. 6159; Part 1, pp. 615918; International Society for Optical Engineering.

Passive coherent location system simulation and evaluation, Proc. SPIE, vol. 6159, 615917 (2006); DOI:10.1117/12.675065, Apr. 26, 2006 ; Conference Title: Photonics Applications in Astronomy, Communications, Industry, and High-Energy Physics Experiments IV Libor Slezák, Michael Kvasnicka, Martin Pelant, and Jit Vavra *Era a.s.* (Czech Republic) *Radek Plsek Technical Univ. of Pardubice* (Czech Republic).

World Airport Week, "Sharing Makes the Airport Go Round" Jan. 21, 1997, p. 1.

Huaiying Tan et al. *PCL System With Illuminator of Opportunity* Proceedings of 2006 CIE International Conference on Radar, vol. 1,Oct. 16, 2006.

Griffiths H D et al., *Denial of Bistatic Hosting by Spatial-Temporal Waveform Design* IEE Proceedings: Radar, Sonar & Navigation, Institution of Electrical Engineers, GB, vol. 152, No. 2, Apr. 8, 2005.

Jafargholi et al, *High Accurate Multiple Target Detection in PCL Radar Systems*, Radar, 2006, CIE '06. International Conference on, IEEE, PI, Oct. 1, 2006.

Terminal, Landing Fees Increase, Dianne Gouliquer, Northern Ontario Business, Sudbury, Apr. 1, 2001, vol. 21, Issue 6, p. 24.

Conflict Detection and Resolution for Future Air Transport Management, Jimmy Krozel, Ph.D, Mark E. Peters, and George Hunter, TR 97138-01, NASA Ames Research Center, Contract NAS2-14285, Apr. 1997.

ADS-X—Next Generation Surveillance Solutions, Alex Smith, Russell Hulstron, Rannoch Corporation, ATCA Oct. 2006.

Transtech Airport Solutions, Inc., http://www.transtech-solutions.com/products/asm/airport.html, Feb. 12, 2009.

Eurocontrol Standard Document for Surveillance Interchange Part 14: Category 020, Multilateration Target Reports, SUR.ET1.ST05.2000-STD-14-02, Apr. 2008.

ATO Advanced Technology Development and Prototyping Group, http://222.faa.gov/about/office_org/headquarters_offices/ato/service_units/operations/td/.. Jan. 16, 2008.

Honeywell Mode S Transponder 2/3/4 Requirements, undated.

MSS by ERA, ERA Corporation, McLean, Virginia, undated.

Form B—Proposal Summary, NASA SBIR 02-1 Solicitation, http://sbir.nasa.gov/SBIR/abstracts/02/sbir/phase1/SBIR-02-1-A3.01-9714.html Sep. 5, 2002.

Form 9B—Project Summary, NASA SBIR 00-1 Soliciation http://sbir.nasa.gov/SBIR/abstracts/00/sbir/phase1/SBIR-00-1-04.01-9704.html Feb. 12, 2009.

NASA 1998 SBIR Phase 1, Proposal No. 91-1 01.02-9780B (1998) http://sbir.nasa.gov/SBIR/abstracts/98/sbir/phase1/SBIR-98-1-01.02-9780B.html.

Nova 9000 Air Traffic Control System (ATCS), Park Air Systems, undated.

"UK ADS-B in radar environment" (Mark Watson) http://www.eurocontrol.int/cascade/gallery/content/public/documents/Presentations/Session%20%202%20-%20Trials%20and%20Implementations/Watson%20-%20UK%20ADS-B%20in%20a%20radar%20environment.pdf (2006).

Ground Vehicle Operations on Airports, FAA Advisory Circular AC No. 150/5210-20 Jun. 21, 2002.

LAND USE COMPATIBILITY PLANNING SOFTWARE

CROSS-REFERENCE TO RELATED APPLICATIONS

The present application claims priority from Provisional U.S. Patent Application No. 60/534,706 filed on Jan. 8, 2004, and incorporated herein by reference in its entirety.

The present application is also a Continuation-In-Part application of U.S. patent application Ser. No. 10/751,115 filed on Jan. 5, 2004 now U.S. Pat. No. 6,992,626, and incorporated herein by reference in its entirety.

The present application is also a Continuation-In-Part application of U.S. patent application Ser. No. 10/457,439 filed on Jun. 10, 2003 now U.S. Pat. No. 6,885,340, and incorporated herein by reference in its entirety.

The present application is also a Continuation-In-Part application of U.S. patent application Ser. No. 10/743,042 filed on Dec. 23, 2003 now U.S. Pat. No. 7,132,982, and incorporated herein by reference in its entirety.

The present application is also a Continuation-In-Part application of U.S. patent application Ser. No. 10/756,799 filed on Jan. 14, 2004 now U.S. Pat. No. 7,126,534, and incorporated herein by reference in its entirety.

The present application is also a Continuation-In-Part application of U.S. patent application Ser. No. 10/830,444 filed on Apr. 23, 2004 now U.S. Pat. No. 7,123,192, and incorporated herein by reference in its entirety.

The subject matter of the present application is related to the following issued U.S. Patents, assigned to the same assignee as the present invention, all of which are incorporated herein by reference in their entirety:

U.S. Pat. No. 6,049,304, issued Apr. 11, 2000, entitled "Method and Apparatus for Improving the Accuracy of Relative Position Estimates In a Satellite-Based Navigation System";

U.S. Pat. No. 5,999,116, issued Dec. 7, 1999, entitled "Method and Apparatus for Improving the Surveillance Coverage and Target Identification in a Radar Based Surveillance System";

U.S. Pat. No. 6,094,169, issued Jul. 25, 2000, entitled "Passive Multilateration Auto-Calibration and Position Error Correction";

U.S. Pat. No. 6,384,783, issued on May 7, 2002, entitled "Method and Apparatus for Correlating Flight Identification Data With Secondary Surveillance Radar Data";

U.S. Pat. No. 6,633,259, issued Oct. 14, 2003, entitled "METHOD AND APPARATUS FOR IMPROVING THE UTILITY OF AUTOMATIC DEPENDENT SURVEILLANCE";

U.S. Pat. No. 6,211,811, issued Apr. 2, 2001, entitled "Method and Apparatus for Improving the Surveillance Coverage and Target Identification in a Radar Based Surveillance System";

U.S. Pat. No. 6,448,929, issued Sep. 10, 2002, entitled "Method and Apparatus for Correlating Flight Identification Data With Secondary Surveillance Radar Data";

U.S. Pat. No. 6,567,043, issued May 20, 2003, entitled "METHOD AND APPARATUS FOR IMPROVING THE UTILITY OF AUTOMATIC DEPENDENT SURVEILLANCE";

U.S. Pat. No. 6,812,890, issued Nov. 2, 2004, entitled "VOICE RECOGNITION LANDING FEE BILLING SYSTEM"; and U.S. Pat. No. 6,806,829, issued Oct. 29, 2004, entitled "METHOD AND APPARATUS FOR IMPROVING THE UTILITY OF AUTOMATIC DEPENDENT SURVEILLANCE".

FIELD OF THE INVENTION

The present invention relates to a software system for land use compatibility planning. In particular, the present invention is directed toward software for use at airports to allow the airport to use flight tracking and noise software for other management purposes.

BACKGROUND OF THE INVENTION

Federal Regulation 49 CFR §77 ("part 77") establishes standards and notification requirements for objects affecting navigable airspace. This notification serves as the basis for evaluating the effect of the construction or alteration on operating procedures. In addition, notification under part 77 is used in determining the potential hazardous effect of the proposed construction on air navigation, identifying mitigating measures to enhance safe air navigation, and charting of new objects. Information on the part 77 standard and process (including the forms) is contained on the FAA website.

Notification allows the Federal Aviation Administration (FAA) to identify potential aeronautical hazards in advance thus preventing or minimizing the adverse impacts to the safe and efficient use of navigable airspace.

Under 49 CFR §77.13—Any person/organization who intends to sponsor construction or alterations must notify the Administrator of the FAA. The construction and alterations include any construction or alteration exceeding 200 ft above ground level, or any construction or alteration within 20,000 ft of a public use or military airport which exceeds a 100:1 surface from any point on the runway, within 10,000 ft of a public use or military airport which exceeds a 50:1 surface from any point on the runway, or within 5,000 ft of a public use heliport which exceeds a 25:1 surface. In addition, the FAA should be notified under part 77 for the construction or alteration of any highway, railroad or other traverse way whose prescribed adjusted height would exceed that above noted standards, when requested by the FAA, or for any construction or alteration located on a public use airport or heliport regardless of height or location.

Persons failing to comply with the provisions of FAR Part 77 are subject to Civil Penalty under Section 902 of the Federal Aviation Act of 1958, as amended and pursuant to 49 USC §46301(a). Proposals that are subject to the above must file whether the proposed modification in on or off of airport property. On-Airport evaluations are administered by the FAA Airports Division, with coordinated assistance from Flight Procedures, Airway Facilities and Air Traffic Divisions. Off-Airport evaluations are administered by the FAA Air Traffic Division.

Airports that have received federal funds have an obligation through grant assurances to identify and mitigate hazards to navigable airspace at their airport. Construction or alteration of objects on or around airports can have an adverse impact to operations at an airport. These may include construction of objects may result in an increase to approach minimums to runways, the location of constructed objects may impact runway protection zones, safety areas, object free areas and obstacle free zones, and the transmitting frequency of the proposed facility which may impact the proper operation of navigational aide facilities at an airport.

In considering the vested interest airport owners have in the airport infrastructure, it is prudent for owners to protect the airspace around the airport. All modifications, whether permanent or temporary, are subject to the notice requirement outlined above. Airport owners/operators should assure that all such improvements are properly evaluated by the FAA prior to commencement of the work.

The FAA paperwork requirements under 49 CFR §77 are thus quite extensive. One of these requirements is the land use compatibility survey or study. At many airports, the land use compatibility process involves the use of paper maps, a ruler, and a calculator. For example, a cellular telephone provider will call the noise officer and inquire as to whether or not a cell tower can be erected at a specific latitude/longitude location.

The noise officer may then have to refer to the projected 65 or 70 DNL noise contours for the airport, for ten, fifteen, or twenty years from the present date. A structure such as a cell tower has minimal environmental impact and is not considered residential, so its placement may be relatively independent of an airport's contour maps. However, the noise officer may have to compute whether the proposed structure violates FAA's obstruction clearance criteria as set out in FAA's standard for obstacle clearance zones (Part 77) as discussed above.

As one might expect, the Part 77 standard is well defined by FAA and is designed to protect the integrity of signals emanating from airport landing aids and to provide sufficient margin for approaching or departing aircraft. The problem is that it is fairly complex and time consuming to be computed manually. A need exists in the art to assist airport operators and managers in preparing the necessary land use compatibility materials and forms for compliance with 49 CFR §77.

Previous techniques to monitor and estimate passenger flow at airports did not account for key items of data, such as the number of passengers onboard each aircraft. Preston Aviation and Megadata Corporation jointly marketed a solution that included 4-dimensional modeling as well as aircraft position in the terminal area. This approach lacked several data items including the actual number of passengers on the aircraft as well as the aircraft's actual position on the airport surface after it had landed.

Other systems use some real time data as well as forecast data such as the PlanFlow system. This system interfaces with data from a number of different systems to support its modeling features. These include Bag Conversion Data, Flight Schedules and Passenger Forecasts, Flight Events, Passenger Transfer Manifests (PTMs) SMPT Data, and Live BSM Data. Both the Bag Conversion Data and Passenger Forecast data are provided by Real Time's Resource Management System, FirstPlanIT. The limitations of this approach are the forecast data, which may not be accurate to account for the many real time influences on air traffic control, such as weather or other operational events. In addition, the approach assumes access to certain airline manifest information, which may or may not be available at any particular airport or for certain carriers.

Some vendors have attempted to provide passenger flow prediction based on the fusion of a number of different airport data sources. The system built by Switch stores a number of airport parameters in a centralized database server and attempts to predict passenger counts based on these external parameters. The system has no means of actually determining the number of passengers on board each aircraft.

Systems developed for other modes of transportation such as transit and bus terminals count passengers mechanically or use passive infrared sensors placed at ingress and egress points. This information calibrates models that are used to help allocate resources, determine passenger delays and passenger throughput. The system sold by Infodev provides passenger flow and other information to public transit operators to help support intelligent transportation systems. These systems help transit operators allocate resources, determine use, and measure performance. However, these systems do not work in real-time.

A number of commercial and shareware applications support the decoding of ACARS data from radios. The company AirNavSystems has software that allows the user to download ACARS data through the sound card in a PC. This software can only listen to only one ACARS frequency at time and is designed for the aviation enthusiast. The data does contain positional information that can be plotted on a map but this data is not refreshed frequently. AirNavSystems does have software that shows simulated aircraft at the airport but this application is designed to provide more realistic backgrounds for MS Flight Simulator 2004 and for accurate aircraft and passenger tracking.

A number of shareware software is available to download and interpret ACARS data. Examples of such shareware software includes WACARS, JACARS, Flight1, as well as others. These programs all have the capability to download and interpret ACARS data but are designed for and supported by aviation enthusiasts. These applications do not attempt to provide anything more than entertainment and have no specific business purpose or function.

SUMMARY OF THE INVENTION

The AirScene™ land use compatibility software module is a new feature, which may be integrated within the AirScene™ airport management suite of programs. The AirScene™ suite of programs is disclosed, for example, in its various embodiments described by the Patent Applications and issued Patents cited above and incorporated by reference. The Airscene™ system is available from Rannoch Corporation of Alexandria, Va., assignee of the present application.

Although not a direct noise monitoring responsibility, land use compatibility has a strong environmental component and many airport offices that deal with noise management have to deal with land use compatibility. This software was developed after extensive discussions with existing AirScene™ clients, as well as potential new clients. Airport noise officers have indicated that noise abatement staff spend a significant amount of time on land use compatibility issues. Some airports deal with them on a daily basis while others handle inquiries two to three times per week.

As noted above, in the Prior Art, land use compatibility management is a manually intensive and time-consuming process. The noise officer may have to compute whether a proposed structure violates FAA's obstruction clearance criteria as set out in FAA's standard for obstacle clearance zones (Part 77). Obstacle clearance zones may include: Missed precision approach; Primary surface; Transition surface; and Approach surface zones.

With these three-dimensional zone shapes entered into AirScene™, the user may enter latitude, longitude and height data for potential obstructions, such as cellular telephone towers as mentioned in the above example. The system will plot the potential obstructions on the map and will determine whether or not the height and proposed position of the tower violates the FAA's obstruction criteria for that runway.

Initially there is some labor to set up the clearance surfaces for each runway according to the criteria, but once entered, they function like any other three-dimensional object such as a corridor or gate, and then can be used to generate "exception reports" for proposed structures. AirScene™ offers a library of Part 77 surfaces, which the user may apply to each approach and departure.

The AirScene™ software may also be used to automatically generate FAA forms including 7460-1, "Notice of Proposed Construction or Alteration".

DETAILED DESCRIPTION OF THE INVENTION

Figure 1:
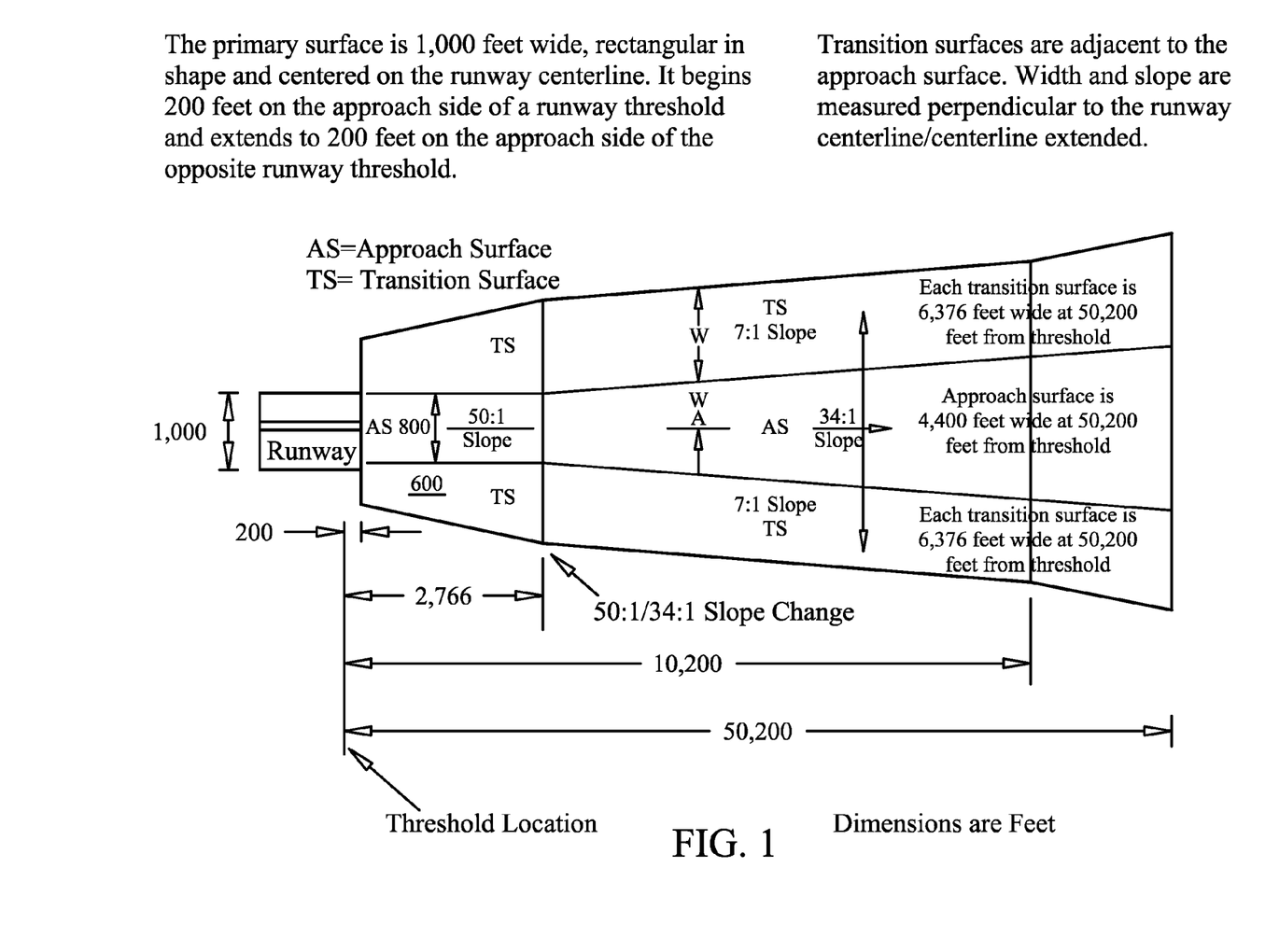
FIG. 1 is a diagram illustrating the FAA Criteria for Obstacle Clearance.

FIG. 1 is a geometric description of the obstacle clearance criteria for a runway approach. Sample Part 77 object identification surfaces, some of which are illustrated in FIG. 1, are defined by the FAA as follows.

The Primary Surface (PS) is defined as a surface longitudinally centered on a runway. When the runway has a specially prepared hard surface, the primary surface extends 200 feet beyond either end of the that runway; but when the runway has no specially prepared surface, or planned hard surface, the primary surface ends at the physical ends of the runway. The elevation of any point on the Primary Surface is the same as the elevation of the nearest point on the runway centerline. Primary surface widths vary with the classification of the runway; however, the width is uniform throughout and is based on the most precise approach existing or planned for either end of that runway.

The Horizontal Surface (HS) is defined as a horizontal plane 150 feet above the established Airport Elevation, the perimeter of which is constructed by swinging arcs of specified radii from the center of each end of the Primary Surface of each runway. Tangents then connect the adjacent arcs. Size of arcs as follows. For all runways designed visual or utility, the radius of each arc is 5,000 feet. For PIR and Non-Precision Instrument Runways, the radius of each arc is 10,000 feet. The radius of the arcs specified for each end of a runway will have the same numerical value, that value being the highest determined for either end of the runway. When a 5,000 foot arc is encompassing by tangents connecting two adjacent 10,000 foot arcs, it shall be disregarded.

The Conical Surface (CS) is defined as a surface, which extends upward and outward from the outer limits of the Horizontal Surface for a horizontal distance of 4,000 feet. The slope of the conical surface is 20-1 (5 percent) measured in a vertical plane.

A Transitional Surface (TS) is defined as a surface extending outward and upward, at right angles to the runway centerline and runway centerline extended, from the sides of the Primary Surface and the Approach Surfaces. The slope is 7-1 (14.3 percent) and the surface extends until it intersects the Horizontal or Conical Surface. A PR Approach Surface that project beyond the limits of the Conical Surface extends a distance of 5,000 feet measured horizontally from the edge of the Approach Surface. The slope is 7-1 (14.3 percent).

Approach surfaces for precision instrument approach may be separately defined as a surface, longitudinally centered, on the extended centerline of the PR runway, beginning at the end of the Primary Surface and extending outward and upward at a slope of 50:1 (2.0 percent) for a horizontal distance of 10,000 feet and at a slope of 40:1 (2.5 percent) for an additional 40,000 feet. The surface width is that of the Primary Surface at the beginning and increases uniformly to a width of 16,000 feet at a distance of 50,000 feet from the end of the Primary Surface.

For a non-precision instrument approach, where the visibility minimum is as low as mile, the surface may be defined as a surface longitudinally centered on the extended centerline of the runway, beginning at the end of the Primary Surface. The width may be equal to the Primary Surface width at the end adjacent to the runway end and flaring to 4,000 feet at a distance of 10,000 ft from the end of the Primary Surface. The surface slope is 34-1 (3 percent).

For a non-precision approach, where visibility minimums are greater than a mile, dimensions of the specified runway are predicated on the approach visibility minimums. A surface longitudinally centered on the extended centerline of the runway, beginning at the end of the Primary Surface. The width of this surface is 500 feet at the end of the Primary Surface and flares to a width of 3500 feet at a distance of 10,000 feet from the end of the Primary Surface. The surface slope is 34-1 (3 percent).

For a visual approach, a surface is defined longitudinally on the extended centerline of the runway, beginning at the end of the Primary Surface. The width at this point is 500 feet and it flares to 1,500 feet at a distance of 5,000 feet from the end of the Primary Surface. The surface slope is 20-1 (5 percent).

For a Non Precision (NP) approach, utility runways with Non-Precision Approach Surfaces are not affected by visibility minimums. The width of this surface if 500 feet at the end of the Primary Surface and flare s to a width of 2,000 feet at a distance of 5,000 feet from the end of the Primary Surface. The surface slope is 20-1 (5 percent). A surface longitudinally centered on the extended centerline of the runway, beginning at the end of the Primary Surface, and with dimensions predicated upon the permissible approach visibility minimums established for the specific runway end, as follows.

For a (V) Visual Approach, the surface begins with a 250-feet width at the end of the Primary Surface and flares to a width of 1, 250 feet at a distance of 5,000 feet from the end of the Primary Surface. The surface slope is 20-1 (5 percent).

For an Area Navigation Approach, a number of Object Identification Surfaces may be defined. The Primary Surface may be defined as a surface a 1,000 foot wide rectangular in shape and centered on the runway centerline, beginning 200 feet on the approach side of a runway threshold and extending to 200 feet beyond the opposite runway threshold. The elevation of any point on the Primary Surface is the same as the elevation of the nearest point on the runway centerline.

A Transitional Surface (TS) may be defined as a surface extending outward and upward, starting from the runway threshold from the edge of the Approach Surface. The surface width is 600 feet at the beginning and increases uniformly to a width of 6,376 feet at a distance of 52,000 feet from the threshold. The slope is 7-1 (14.3 percent).

The Approach Surface (AS) may be defined as follows for the following scenarios.

For a Precision, Conventional Landing, the Approach Surface may comprise a surface longitudinally centered, on the extended centerline of the runway, beginning at the end of the Primary Surface and extending outward and upward at a slope of 50:1 (2.0 percent) for a horizontal distance of 2566 feet and at a slope of 34:1 (3.0 percent) for an additional 47,434 feet. The surface width is that of the Primary Surface (800 feet) at the beginning and increases uniformly to a width of 4,400 feet at a distance of 50,200 feet from the Threshold.

For a Missed Approach, the Approach Surface may be defined as a surface longitudinally centered, on the extended centerline of the runway, beginning at 1300 feet outboard from the approach runway threshold, width of surface is 2,333.3 feet and 22 feet above the threshold elevation. The surface extending outward and upward at a slope of 40:1 (2.5 percent) for a horizontal distance of 7800 feet. The surface width is 2,333.3 feet at the beginning of the missed approach and increases uniformly to a width of 6,200 feet at a distance of 7,800 feet from the end of the Primary Surface.

Figure 2:
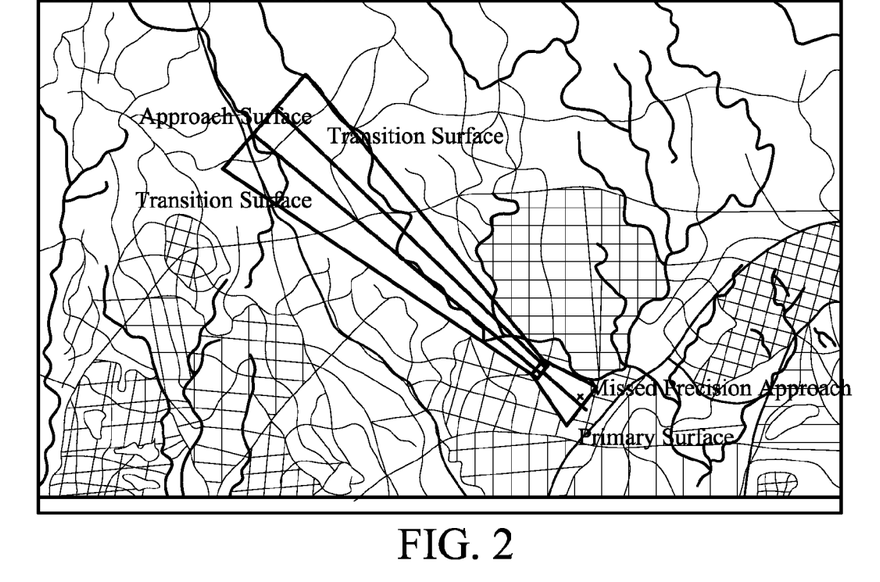
FIG. 2 is an AirScene view for obstacle clearance zones for a typical airport (KSAT Runway 12R) illustrating Part 77 Surfaces Overlaid on GIS.
Figure 3:
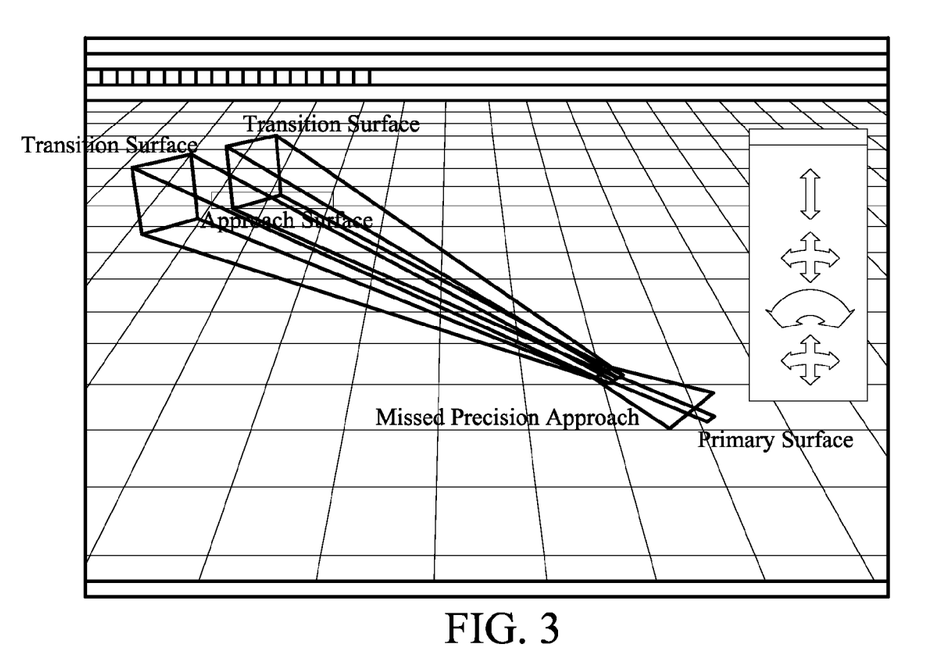
FIG. 3 is an AirScene view for obstacle clearance zones for a typical airport (KSAT Runway 12R) illustrating AirScene Part 77 Surfaces, 3-D View.

FIGS. 2 and 3 are two AirScene views for obstacle clearance zones for San Antonio runway 12R. Obstacles included are: Missed Precision Approach; Primary Surface; Transition Surface; and Approach Surface, as defined above.

Figure 4:
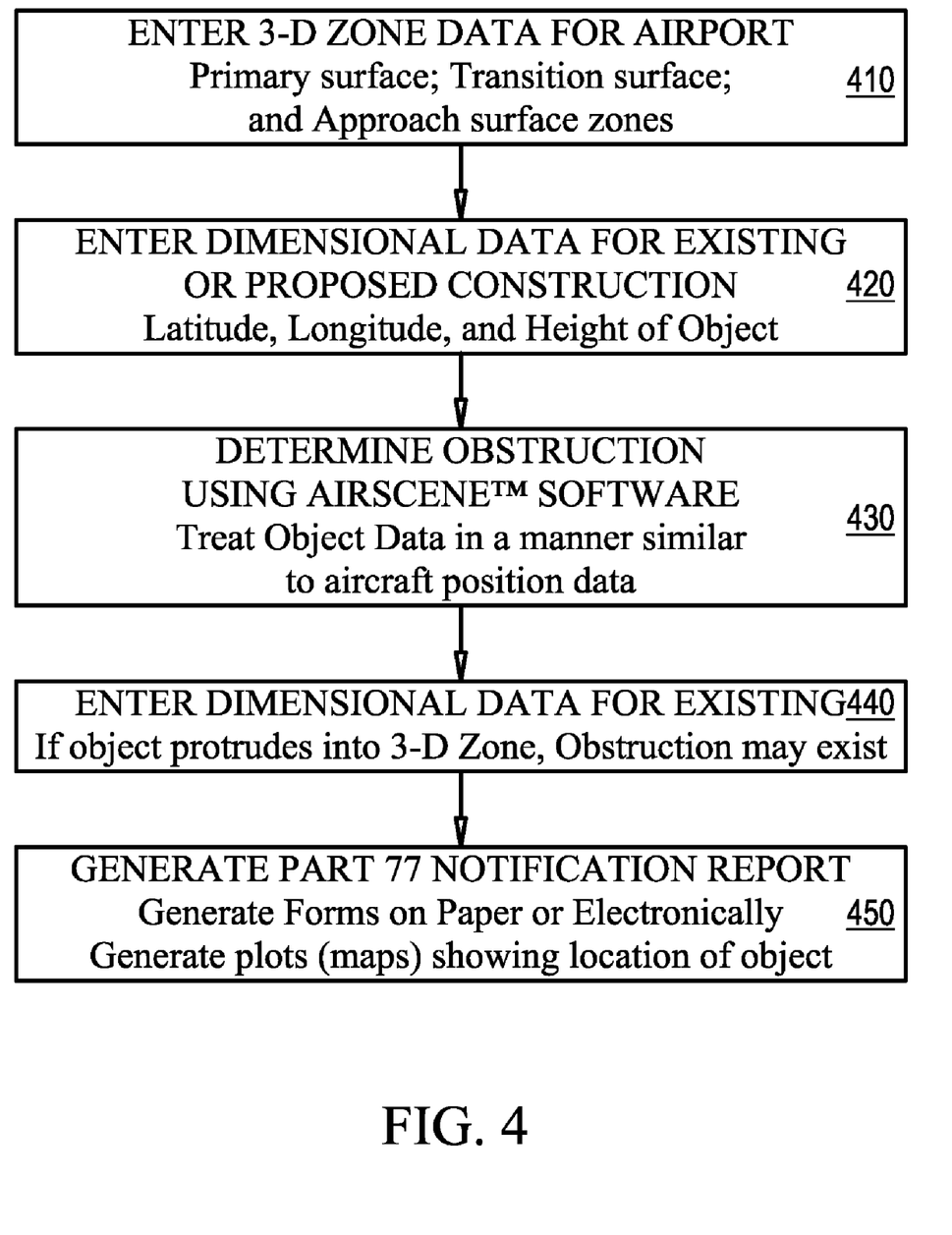
FIG. 4 is a block diagram illustrating the steps in setting up and operating the Part 77 software module of the present invention.

FIG. 4 is a block diagram illustrating the steps in setting up and operating the Part 77 software module of the present invention. In a first step 410 in the process, 3-D data for the airport is entered into the AirScene™ database. Much of this data may already be in the AirScene™ database, if the AirScene™ software is already in use at the airport for tracking airplanes on the ground, taking off, or landing, and also in use for obstacle avoidance for aircraft in an around the airport. Obstacle clearance zones may include: Missed precision approach; Primary surface; Transition surface; and Approach surface zones.

With these three-dimensional zone shapes entered into AirScene™, the user may enter latitude, longitude and height data in step 420 for potential obstructions, such as cellular telephone towers as mentioned in the above example. In step 430 the AirScene™ system will plot the potential obstructions on the map and will determine whether or not the height and proposed position of the tower violates the FAA's obstruction criteria for that runway. The algorithm for this calculation may be based upon an aircraft obstruction avoidance algorithm and other AirScene™ algorithms used to track aircraft and ground vehicles in an around an airport. Thus, the system does not require a large amount of additional database or calculation software to run, and can be offered to airport operators as an inexpensive add-on software module.

In step 440, a determination is made whether an obstruction exists. Such a determination might be that a cell phone tower, office building, or the like interferes with the landing approach or missed approach (go around) to take-off path of an airplane (within FAA parameters) and/or may interfere with glideslope radio signals, sight lines for runways or the like. Again, using modified versions of the existing AirScene™ software, it is not difficult to calculate this data without having to re-invent the algorithms.

In step 450, FAA Part 77 (or other regulatory body) reports (or just informational reports for the user) may be generated. These may take the form of paper forms and also plots illustrating (in 2-D or 3-D) the location of the existing or proposed object (tower, building, or the like) relative to the 3-D zones associated with the airport (or proposed new airport). This report can be electronically generated as well and electronically submitted to the FAA or other governing body for approval as a Part 77 Notice report or the like.

With these three-dimensional shapes entered into AirScene, the user may enter latitude, longitude and height data for potential obstructions, such as cellular telephone towers as mentioned in the above example. The system plots the potential obstructions on the map and will determine whether or not the height and proposed position of the tower violates the FAA's obstruction criteria for that runway. Initially there is some labor to set up the clearance surfaces for each runway according to the criteria, but once entered they function like any other 3-dimensional object such as a corridor or gate, and then can be used to generate "exception reports" for proposed structures.

The AirScene software may then be used to automatically generate FAA forms including 7460-1, "Notice of Proposed Construction or Alteration." These forms may be printed out or submitted electronically to the FAA for part 77 Notification compliance. By integrating Part 77 Notification utilities into the existing AirScene™ software, an airport operator is provided with an inexpensive means of complying with complex FAA standards in an accurate and automated fashion. The system of the present invention insures that the data for part 77 compliance is accurately recorded and calculated and moreover does so without requiring repeated extensive surveys, measurements, calculations and expertise on the part of the operator. Once initially set up, the system can be used over and over again. This insures not only that the airport is in compliance with Federal laws, but also helps maintain safe operation of the airport.

While the present invention is described in connection with the FAA part 77 compliance, the present invention may also be used as a stand-alone system for general safety assurance at any type of airport, foreign or domestic. Moreover, the present invention may be suitably altered to provide compliance to other types of safety standards, including foreign safety standards, international safety standards, and safety and other standards promulgated by standards organizations and the like.

In addition, the system of the present invention may be applied to off-airport applications where building clearances, sight lines, radio interference, interference with air traffic (helicopter traffic and the like) and the like are of interest.

The present invention may also be applied to the problem of Airport Passenger Flow planning in addition to the airport planning dealing with FAR part 77 and airport planning.

Figure 5:
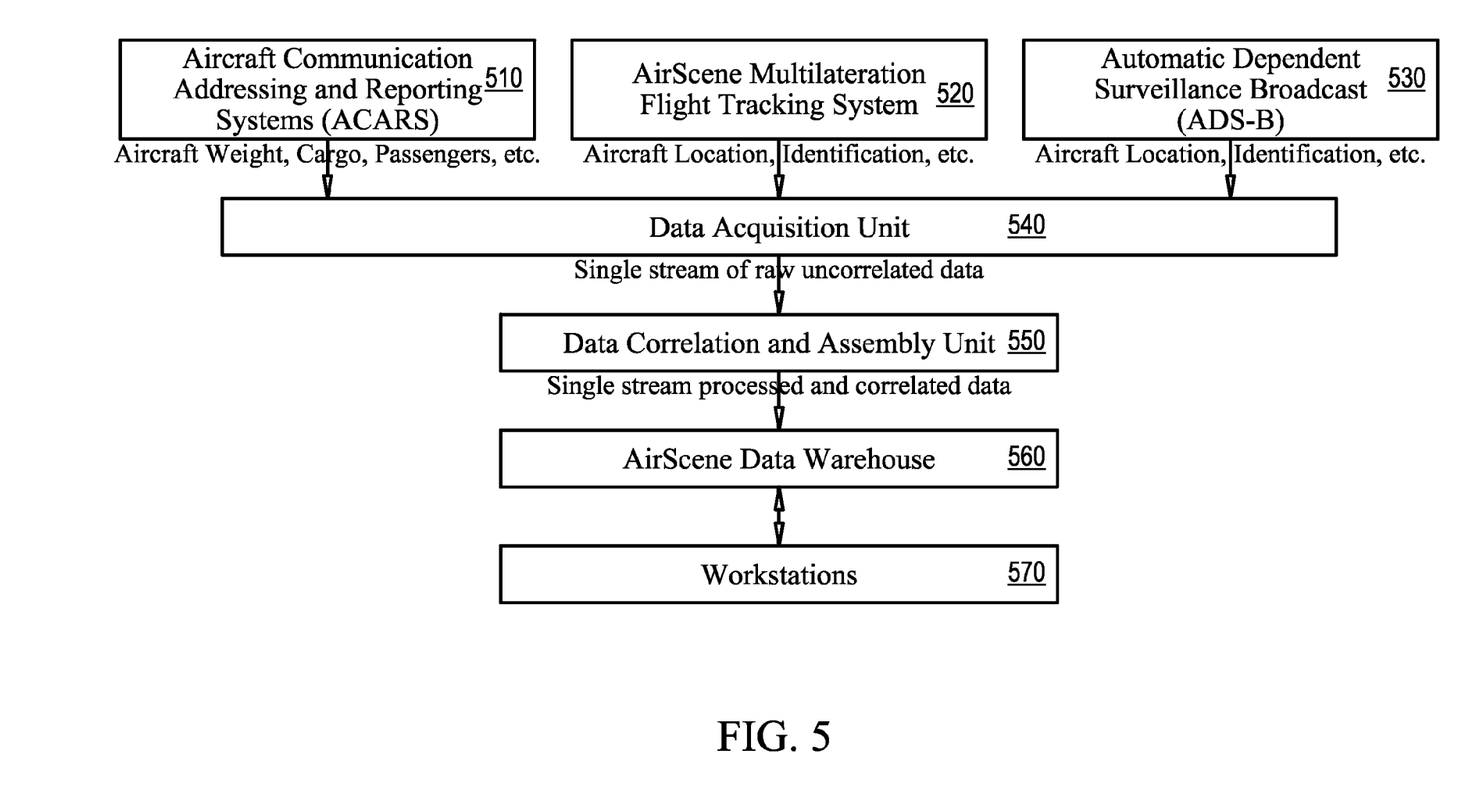
FIG. 5 is a block diagram illustrating the steps in an alternative embodiment of the present invention wherein airport passenger and baggage flow and other parameters may be determined.

FIG. 5 is a block diagram illustrating the steps in an alternative embodiment of the present invention wherein airport passenger and baggage flow and other parameters may be determined. Data from various sensors and sources feeds into the system. Data sources may include but are not limited to ACARS 510, ADS-B 530, AirScene Multilateration Tracking System 520, and the like. The data fields from these various sources may include but are not limited to aircraft weight, cargo weight, number of passengers, positional information, velocity, fuel on board, on-block time, off-block time, time of landing, time of lift off, origin, destination, runway used, gate used, time at gate, and the like.

The data acquisition unit (DAU) 540 acquires this data and stores it until it is transferred to the data correlation and assembly unit (DCAU) 550. DCAU 550 processes this raw data from the different sources 510-530 and constructs a single complete set of data for each unique aircraft.

DCAU 550 also processes the data with respect to the GIS data for the airport, including the orientation or runways, taxiways, and buildings. If a weather data feed is available, this data can be used to assist with the aircraft estimate of arrival time (ETA) at the gates. For example, heavy rain may add delay to an ETA. In addition, historical airport performance data may be used to enhance the estimate of the aircraft ETA. All of these data feeds are not essential, but are used in the estimation of ETAs, if they are available.

This processed data is then transferred to the AirScene Data Warehouse (ADW) 560. The Data Warehouse is a relational database (i.e. Microsoft SQL Server or Oracle 8i) that enables access to the data for analysis and reporting purposes. It is the access to the data in the relational database server that provides the desired results from the system.

There are a number of sample uses for this data. For example, airport resource managers can run reports from one of workstations 570, which describe the number of people enplaned or deplaned at each gate, at each terminal, at the airport, and the like. Airport billing departments can link their accounting systems directly to the ADW and extract data required to produce passenger facility charge (PFC) audit reports. Airport planners can extract the data necessary to compute the tonnage of cargo landed on each runway for application to the FAA for additional funding. Airport maintenance departments will run reports to determine the total tonnage of aircraft landing on each runway for anticipating maintenance requirements.

In the Prior Art, an airport may use various "home grown" models for planning. For example, Time & Motion Modeling may be used to model peak hour usage. Here they take the busiest scheduled hour and apply a figure 90% for the arriving/departing flights. The airport builds and plans around the ability to handle this figure. Capacity Modeling can be used for modeling ticket counter and security checkpoint flows. Also used for modeling baggage claim capacity.

As with the Time & Motion Modeling above, the airport may use a peak % figure of the departing or arriving seats to derive passenger and baggage flows. The only way that the airport can audit the accuracy of the system above is by either paying a consultant or using airport staff to conduct passenger survey and counts.

Thus, the ability of AirScene with ACARS to integrate inbound and outbound aircraft with passenger counts, as illustrated in the embodiment of FIG. 5, provides airports with an independent and automated solution for auditing and even feeding data into their existing airport modeling programs.

The embodiment of FIG. 5 may be used to provide a number of applications or systems for airport use. For example, the system of FIG. 5 may be used to provide an accurate real-time assessment of the number of passengers on each arriving aircraft before it arrives. IN addition, the system of FIG. 5 may provide an accurate real-time assessment of the number of passengers on each departing aircraft at the time the aircraft door is closed.

Moreover, the system of FIG. 5 may also accurately model passenger flow by fusing accurate historic data, flight schedules, and other relevant data, determine the exact time an aircraft arrives or departs a gate, the exact use of the gates and ramps by the passengers, as well as passenger breakdown by time and length of journey flown.

The system of claim 5 may also determine the number of passenger hours spent in stationary airplanes during backups or inclement weather (passenger satisfaction and passenger bill of rights issue). The system of claim 5 may also determine passenger time-based airport performance metrics; time required from the curb to the aircraft and from airplane to curb.

Further applications may include resource management of concessions and security, facilities, transportation, carousels, parking, wheelchairs, and the like. The system may also provide an accurate real-time assessment of the weight of luggage or cargo on each arriving aircraft before it arrives. In addition, the system may provide an accurate real-time assessment of the weight of luggage or cargo on each departing aircraft at the time of departure. The system may also determine the amount of fuel supplied to each aircraft.

All of these embodiments of the system of FIG. 5 are possible, as the ACARS and other data sources provide a rich source of detailed aircraft information, which, when used alone or in combination with other sources (e.g., FAA databases) can provide a complete detailed analysis of each aircraft flight, including but not limited to the number of passengers and crew on board, aircraft weight, fuel requirements, and the like.

From this information, other data, such as luggage weight can be derived. For example, knowing the gross weight of the aircraft, one can infer the luggage weight by subtracting the aircraft (empty) weight and passenger weight (actual or estimated).

Similarly, other data can be created from this data fusion process. For example, many airlines make claims as to "on time" departures or arrivals based upon "push back" times from the gate or based upon landing times. If passengers are forced to wait on the ground in the aircraft for minutes or hours, this time is not considered in airline "on time" arrival and departure data. As a result, most airline "on time" data is rather specious and self-serving. However, the system of the present invention can be used to provide real on-time data.

For example, multilateration data can calculate the position of an aircraft on the ground or in the air. Thus, the time from when an aircraft "pushes back" from the gate until takeoff can be readily calculated from aircraft position data. Real and accurate "on time" data can thus be calculated, and moreover, the amount of time airplanes are sitting on runways and taxiways waiting to take off can be accurately measured. With this data, airport managers and airline operators can better manage flight schedules so as to minimize the number or aircraft waiting in line to take off, or aircraft idling waiting for a gate to open up.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A system for determining land use compatibility in and around an airport, comprising:
    an aircraft tracking system for tracking aircraft positions and flight paths in and around an air port using one or more of multilateration, ADS-B, and surveillance radar for aircraft position data; the aircraft tracking system comparing aircraft position with a predetermined three-dimensional zone data relating to an airport approach criteria for the airport;
    storage memory in the aircraft tracking system, for storing the predetermined three-dimensional zone data relating to an airport approach criteria;
    a data input for accepting position data of an existing or proposed construction as a substitute for aircraft position data; and
    a processor for determining, using the aircraft tracking system and the position data of the existing or proposed construction as a substitute for aircraft position data to determine whether or not the position of the existing or proposed construction is within the predetermined three-dimensional zone data for the airport.

2. The system of claim 1, wherein the processor overlays historical flight track data from the aircraft tracking system over the position data of the existing or proposed obstruction to illustrate relationships between aircraft flight tracks and the existing or proposed obstruction.

3. The system of claim 1, wherein the predetermined three-dimensional zone data includes at least one of Missed precision approach, Primary Surface, Transition Surface, and Approach Surface zones.

4. The system of claim 3, wherein the Primary Surface comprises a surface longitudinally centered on a runway, extending 200 feet beyond either end of the runway, when the runway has a specially prepared hard surface, and ending at the end of the runway if the runway has no specially prepared surface.

5. The system of claim 4, wherein the elevation of any point on the Primary Surface is the same as the elevation of the nearest point on the runway centerline and the width of the Primary Surface is uniform throughout and is based on the most precise approach existing or planned for either end of the runway.

6. The system of claim 4, wherein the Approach Surface for a precision instrument approach comprises a surface, longitudinally centered, on the extended centerline of the runway, beginning at the end of the Primary Surface and extending outward and upward at a slope of 50:1 (2.0 percent) for a horizontal distance of 10,000 feet and at a slope of 40:1 (2.5 percent) for an additional 40,000 feet having a width the same as the Primary Surface at the beginning and increases uniformly to a width of 16,000 feet at a distance of 50,000 feet from the end of the Primary Surface.

7. The system of claim 6, wherein the Transition Surface comprises a surface extending outward and upward, at right angles to the runway centerline and runway centerline extended, from the sides of the Primary Surface and the Approach Surfaces having a slope of 7-1 (14.3 percent) and extending until it intersects a Horizontal or Conical Surface.

8. The system of claim 1, wherein the processor generates compliance forms showing that the existing or proposed construction does not violate predetermined obstruction criteria for the airport.

9. The system of claim 1, wherein the processor generates FAA forms including 7460-1, "Notice of Proposed Construction or Alteration" in response to determination of whether or not existing or proposed construction violates predetermined obstruction criteria for the airport.

* * * * *